RESISTIVE CONVERSION DEVICE

Filed Jan. 26, 1968 11 Sheets-Sheet 1

BARRIE GILBERT
*INVENTOR*

*BY*

*BUCKHORN, BLORE, KLARQUIST & SPARKMAN*
*ATTORNEYS*

BARRIE GILBERT
INVENTOR
BY
BUCKHORN, BLORE, KLARQUIST & SPARKMAN
ATTORNEYS

Aug. 18, 1970 B. GILBERT 3,524,998

RESISTIVE CONVERSION DEVICE

Filed Jan. 26, 1968 11 Sheets-Sheet 3

BARRIE GILBERT
*INVENTOR*

*BY*

*BUCKHORN, BLORE, KLARQUIST & SPARKMAN*
*ATTORNEYS*

BARRIE GILBERT
*INVENTOR*
BY
*BUCKHORN, BLORE, KLARQUIST & SPARKMAN*
*ATTORNEYS*

BARRIE GILBERT
*INVENTOR*
*BY*
*BUCKHORN, BLORE, KLARQUIST & SPARKMAN*
*ATTORNEYS*

RESISTIVE CONVERSION DEVICE

Filed Jan. 26, 1968 11 Sheets-Sheet 6

BARRIE GILBERT
*INVENTOR*
*BY*
*BUCKHORN, BLORE, KLARQUIST & SPARKMAN*
*ATTORNEYS*

BARRIE GILBERT
*INVENTOR*

BY
*BUCKHORN, BLORE, KLARQUIST & SPARKMAN*
*ATTORNEYS*

BARRIE GILBERT
*INVENTOR*

BY
*BUCKHORN, BLORE, KLARQUIST & SPARKMAN*
*ATTORNEYS*

FIG. 38
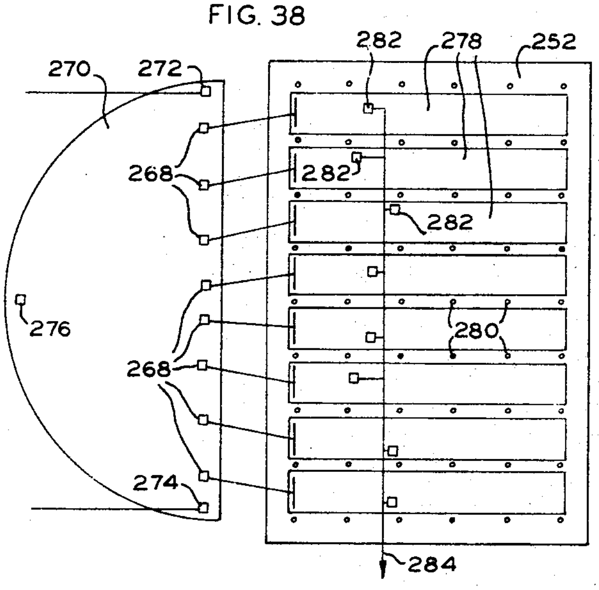
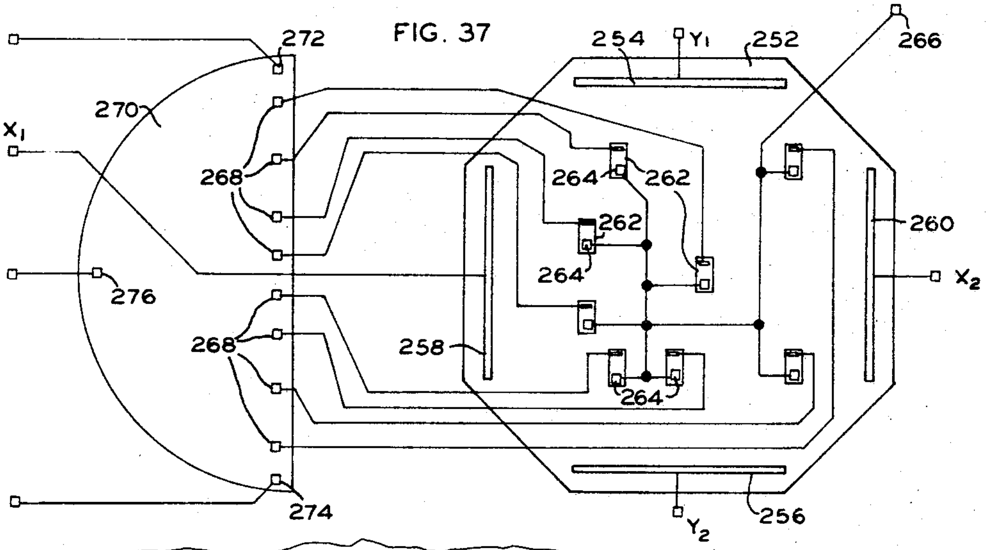
FIG. 39
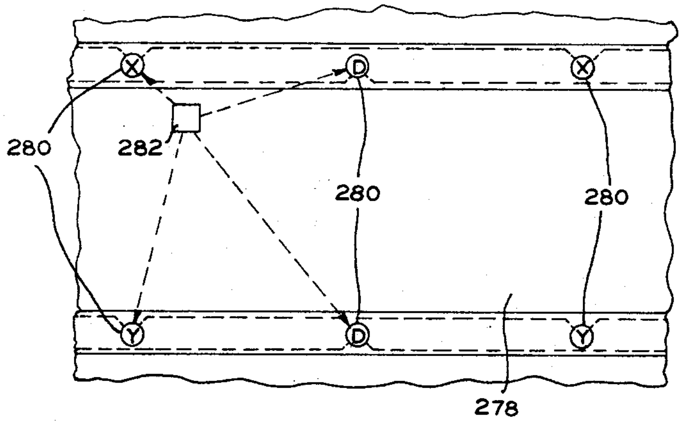
BARRIE GILBERT
INVENTOR
BY
BUCKHORN, BLORE, KLARQUIST & SPARKMAN
ATTORNEYS

RESISTIVE CONVERSION DEVICE

Filed Jan. 26, 1968 11 Sheets-Sheet 10

BARRIE GILBERT
*INVENTOR*

*BY*
*BUCKHORN, BLORE, KLARQUIST & SPARKMAN*
*ATTORNEYS*

RESISTIVE CONVERSION DEVICE

Filed Jan. 26, 1968 11 Sheets-Sheet 11

BARRIE GILBERT
*INVENTOR*

BY
*BUCKHORN, BLORE, KLARQUIST & SPARKMAN*
*ATTORNEYS*

United States Patent Office 3,524,998
Patented Aug. 18, 1970

3,524,998
RESISTIVE CONVERSION DEVICE

Barrie Gilbert, Portland, Oreg., assignor to Tektronix, Inc., Beaverton, Oreg., a corporation of Oregon Filed Jan. 26, 1968, Ser. No. 700,885
Int. Cl. H03k 3/26, 19/08
U.S. Cl. 307—299 39 Claims

ABSTRACT OF THE DISCLOSURE

A resistive medium, suitably in the form of a semiconductive layer, is provided with input connection means as well as output connection means which are geometrically related in a predetermined manner. Either the physical location of an input means determines the proportion of an applied input value which reaches plural output means, or electrical values applied to plural input means determine the geometric position of a particular output value. In one instance, the device is employed as a character generator wherein plural input means define points along the character and provide coordinate outputs for operating an X-Y scanning device reproducing such character. In another instance, input values steer current to a particular output by means of a predetermined voltage distribution upon a resistive medium. Several examples of each type of device are disclosed.

BACKGROUND OF THE INVENTION

Variable as well as fixed resistive devices are available, but variable types are usually of the mechanically adjustable variety. In circuitry for automatically or electrically selecting between a number of different resistance values, the means frequently employed is either cumbersome because of employment of mechanical means, or is inclined to produce stepwise resistance changes. When selection of many resistance values is required, complex resistance networks are sometimes used but suffer from lack of simple reproducibility from one to the next, and therefore from lack of relative accuracy. For example, a method of generating alpha-numeric characters for display on an oscilloscope or the like may comprise plural resistor matrices. One matrix in such a system defines the X coordinates and the other matrix defines Y coordinates of points on a character, while logic circuitry is employed to select connection of resistors to scanning circuits. Such a system is apt to display characters as a plurality of dots, many of which would be required to generate a desirably shaped character. It is usual to restrict the matrix size for economic reasons and thus limit the selection of points from which characters can be built, leading to less than desired appearance of displayed symbols. Moreover, for accuracy, the values in the resistance matrices must be reproduced with considerable care from one matrix to the next.

SUMMARY OF THE INVENTION

In accordance with the present invention, a device for converting between electrical and positional information comprises a resistive medium extending spatially in two or more dimensions and having input means and output means connected thereto with at least one such means being plural. The input means and output means may be geometrically related in a predetermined manner, whereby an input produces a desired output at coordinately related output connections. A plurality of input means can be used to define portions of a character, with such input means being scanned in a manner to produce character segments.

Also, plural input connections may be energized in a manner to provide a voltage distribution on the resistive medium so as to produce a particular voltage value which may be shifted on the medium in accordance with input values applied. In this manner, one of a plurality of output connections may in effect be selected for "steering" controlled currents.

The resistive medium herein employed is preferably semiconductive and comprises layers, or diffusions, themselves forming part of a more complex semiconductor device. Plural transistors may be included on the same semiconductor chip for input and output coupling to the resistive medium. Furthermore, a current-steering resistive device and a character-selecting resistive device may be combined such that input connection means of the latter are selected by output connection means of the former. Several other useful devices are also disclosed and claimed herein, such as storage elements, multipliers, function generators, as well as various combination devices.

It is therefore an object of the present invention to provide an improved resistive conversion device for providing coordinate outputs in response to physical location of an input terminal.

It is a further object of the present invention to provide an improved resistive conversion device for selecting a given output in response to an input value.

It is another object of the present invention to provide an improved analog multiplier means.

It is another object of the present invention to provide improved resistive character generation means.

It is another object of the present invention to provide improved resistive function generator means.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the following drawings wherein like reference characters refer to like elements.

DRAWINGS

FIG. 37 is a schematic diagram of a character generator according to the present invention operated by means of a current steering device according to the present invention;

FIG. 38 is a schematic diagram of a second character generator according to the present invention also operated by a current steering device according to the present invention;

FIG. 39 illustrates in greater detail a portion of the FIG. 38 character generator;

DETAILED DESCRIPTION

The device according to the present invention may be employed either to apply a spatial change in input value connection to provide an electrical output change, or may utilize a change in input values to produce spatial selection of an output. The former type of device is effective as a character generator although it is understood other functions may also be performed thereby.

Character generator

Figure 1:
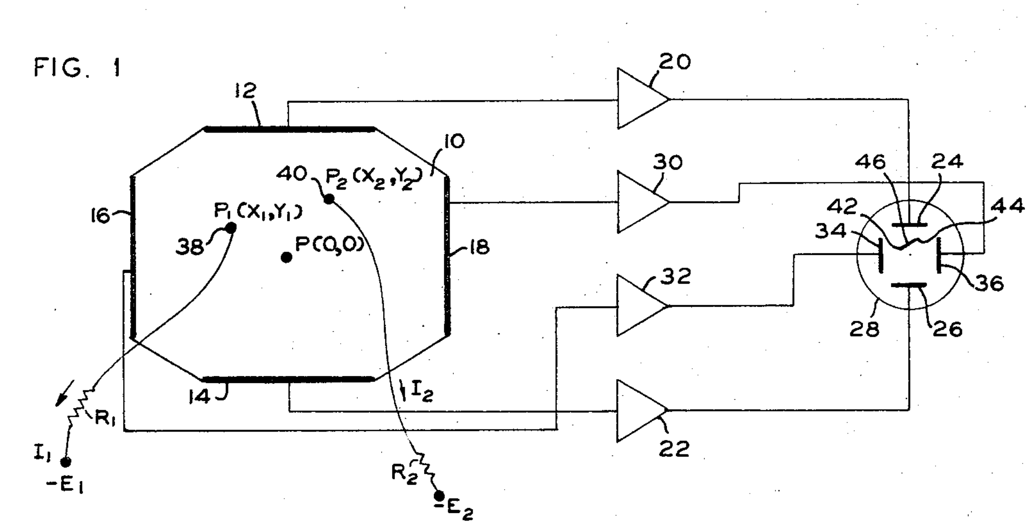
FIG. 1 is a schematic diagram of a first character generator apparatus according to the present invention.

Referring to FIG. 1, a character generator according to the present invention suitably comprises a planar resistive medium 10 provided with four orthogonally related edge electrodes 12, 14, 16, and 18. The medium extends principally in two dimensions and also necessarily has some thickness. The resistivity thereof is desirably uniform. The resistive medium 10 may in a simple form comprise a sheet of resistive paper or similar material having the aforementioned edge electrodes in contact therewith. It is preferably, however, that the resistive medium be composed of a semiconductive layer contributing the advantage of ready miniaturization and connection with integrated circuit elements as hereinafter more fully described. The resistive medium 10 may be rectangular in shape, and is in general preferably square. It has been found advantageous to remove the corners thereof between electrodes as illustrated.

A first pair of electrodes, 12 and 14, which we shall call vertical electrodes, are suitably coupled by way of operational amplifiers 20 and 22 respectively to vertical deflection means or deflection plates 24 and 26 of an X–Y display device, here taking the form of a cathode ray tube 28. Similiarly, horizontal electrodes 16 and 18 are coupled by way of operational amplifiers 30 and 32 to horizontal deflection plates 34 and 36 of cathode ray tube 28. The operational amplifiers are employed as current to voltage converters.

A first input voltage $-E_1$, is applied by connection means 38 to a point $P_1$ having coordinates $x_1$ and $y_1$ upon resistive medium 10, with respect to the coordinately related electrodes 12, 14, 16, and 18 within the bounds of which $P_1$ is located. A resistor $R_1$ is interposed between voltage $-E_1$ and point $P_1$ and a current $I_1$ flows from point $P_1$ through such resistor in response to voltage $-E_1$. A second voltage $-E_2$ is applied by connection means 40 to second point $P_2$, having coordinates $x_2$ and $y_2$, through resistor $R_2$. When the voltage $-E_2$ is applied, current $I_2$ will flow in resistor $R_2$. It is understood that amplifiers 20–30 and 22–32 have predetermined and preferably low input resistances which complete a path for the input currents.

When the input voltage $-E_1$ is applied, a division of current $I_1$ takes place between electrodes 12, 14, 16 and 18 in accordance with the coordinate position of point $P_1$. As a result, an electron beam in cathode ray tube 28 will be deflected to a point 42 corresponding in coordinate position to point $P_1$. Now the voltage in $-E_1$ is gradually decreased and voltage $-E_2$ is gradually increased until current flows only in resistor $R_2$ from point $P_2$ and to resistive medium 10. At this time, the cathode ray tube will have deflected its electron beam to a point 44 corresponding to the coordinate position $P_2$. However, inasmuch as the injection of current gradually shifts from point $P_1$ to $P_2$, the cathode ray tube's electron beam executes a line segment 46 having terminus points corresponding to $P_1$ and $P_2$. In effect a gradual change in resistive coupling is achieved by gradually changing the injection of current between points $P_1$ and $P_2$, whereby a continuous line segment is portrayed by the cathode ray tube. The gradual change in inputs from one point to another is suitably accomplished employing an apparatus arranged to produce triangular wave outputs such as described and claimed in my copending application Ser. No. 646,330, entitled Switching Circuit, filed June 15, 1967, and assigned to the assignee of the present invention.

Figure 7:
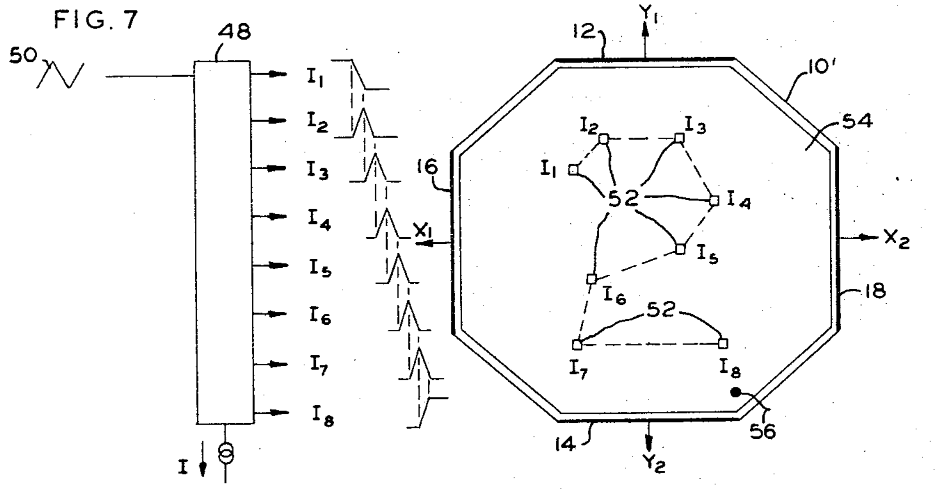
FIG. 7 is a schematic diagram of a character generator embodiment according to the present invention of the type illustrated in FIG. 1.

The character generating device may be expanded to provide a plurality of point such as $P_1$ and $P_2$ across the face of a uniformly-resistive medium 10 so that the cathode ray tube electron beam suitably traces out the form of an alpha-numeric character or other symbol. A character generator of this type is illustrated in FIG. 7 wherein a switching circuit 48 of the type described in my aforementioned application successively provides a plurality of output currents $I_1$ through $I_8$ in response to an input triangular scanning voltage 50. The output waveforms are desirably triangular in shape with each successive current waveform beginning in synchronism with the maximum value of the previous waveform and reaching its maximum value as the previous waveform falls to zero. The sum of currents $I_1$ through $I_8$ desirably totals a constant. In the illustrated example, these currents are respectively applied at the point indicated on resistive medium 10′ so that as such points are consecutively energized, deflection current values $X_1$, $X_2$, $Y_1$ and $Y_2$ are provided for tracing out the numeral 2 on an X-Y scanning device such as an oscilloscope.

The resistive medium 10′ in FIG. 7 is illustrated as a planar semiconductor element which, in the FIG. 7 embodiment, forms the collector of a semiconductor transistor unit. The points of injection 52 for currents $I_1$ through $I_8$ are emitter electrodes and a base layer 54 is interposed therebetween. The base layer 54 is provided with an input connection 56 and provides overall control of the input currents. The foregoing semiconductor construction not only provides advantageous reproducibility, but also lends itself to miniaturization as by integrated circuit techniques, wherein a small semiconductor chip may be employed as the means for generating one or more characters.

Figure 2:
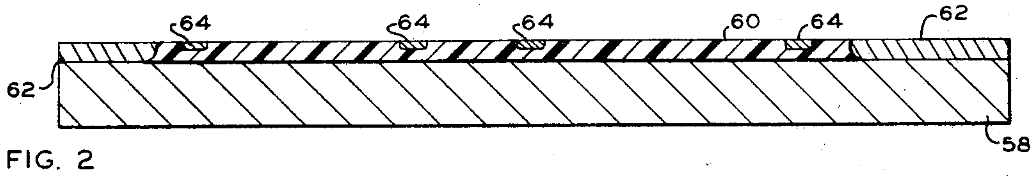
FIG. 2 is a cross section of a semiconductor embodiment of a resistive medium according to the present invention.
Figure 3:
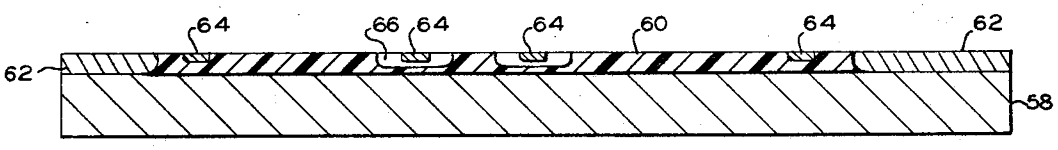
FIG. 3 is a cross section of a second semiconductor embodiment of a resistive medium according to the present invention.
Figure 4:
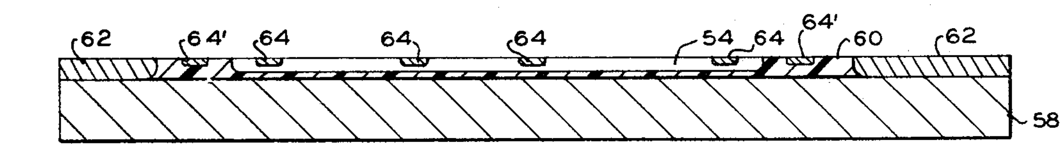
FIG. 4 is a cross section of a third semiconductor embodiment of a resistive medium according to the present invention.

FIGS. 2 through 4 illustrate in cross section the construction of various semiconductor resistive medium devices. Referring to FIG. 2, a semiconductor device comprises P type substrate 58 supporting an N type epitaxial layer 60. A P type isolation diffusion 62 is here illustrated at either end of the device. N type emitter diffusions 64 provide ohmic contact to layer 60 at predetermined locations thereon corresponding to desired injection points for resistive layer 60. FIG. 3 illustrates a variation wherein P type base diffusions 66 are provided between emitter diffusion 64 and epitaxial layer 60. A connection to these P type base diffusions may be used to control the current injected via the various emitter diffusions. FIG. 4 illustrates a device somewhat similar to the type hereinbefore described in connection with FIG. 7, e.g. wherein a common base layer 54 is provided between a plurality of emitter diffusions 64 and epitaxial layer 60. Here emitter diffusions 64′ may suitably be elongated to provide edge contacts or electrodes for the collector.

Figure 6:
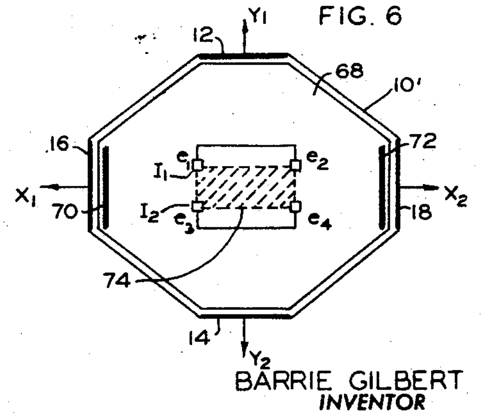
FIG. 6 is a plan view of a resistive medium of the type illustrated in cross section in FIG. 4.

FIG. 6 illustrates a variation of the device wherein emitter contacts $e_1$, $e_2$, $e_3$ and $e_4$ are disposed over base electrode 68, the latter having side contacts 70 and 72. Emitter contacts $e_1$ and $e_2$ are connected together to receive current $I_1$, and emitted electrodes $e_3$ and $e_4$ are connected together to receive current $I_2$. As $I_1$ is decreased and $I_2$ is increased, current injection effectively moves in the Y direction. Current division between base contacts 70 and 72 can move the effective current injection point in the X direction. Therefore the current injection point may in effect be moved within the shaded area 74. Correspondingly proportional currents are provided at edge connection electrodes 12, 14, 16 and 18.

Figures 8, 9:
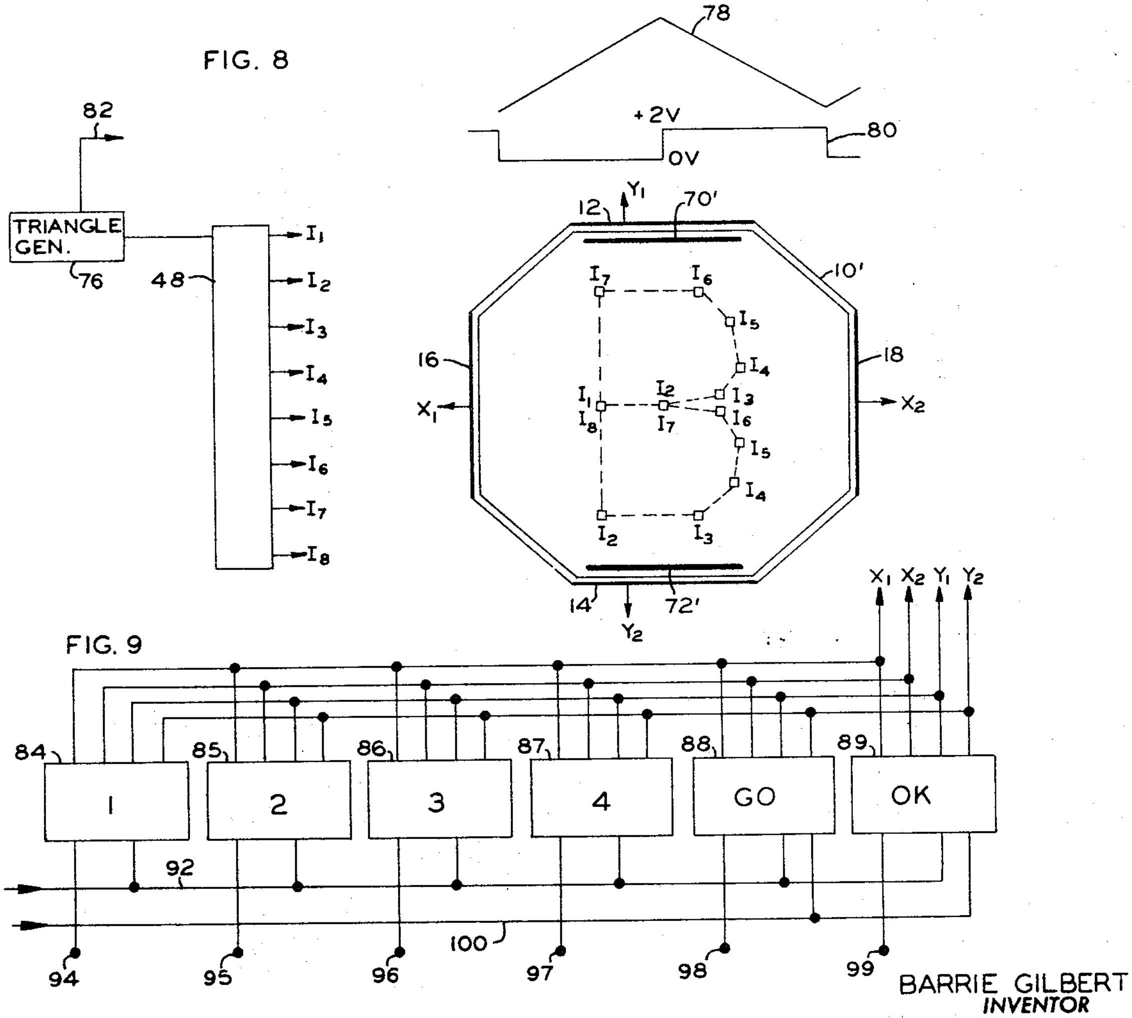
FIG. 8 is a schematic diagram of another character generator embodiment according to the present invention of the type illustrated in FIG. 1.
FIG. 9 is a schematic diagram of a part of a more complex character generator system for selecting one of a plurality of characters.

FIG. 8 illustrates the device of the FIG. 6 type having base contacts 70′ and 72′ as well as duplicate sets of emitter contacts numbered 1 through 8. Triangular generator 76 applies a triangular wave 78 to switching circuit 48 such that currents $I_1$ through $I_8$ are successively produced in the manner described in connection with FIG. 7, after which the reverse procedure takes place. That is, the current output then sequences from $I_8$ through $I_1$. Currents $I_1$ through $I_8$ are applied to correspondingly numbered emitters, and at the same time square wave 80 from terminal 82 is applied at base contact 72′ with respect to contact 70′. As currents $I_1$ through $I_8$ are successively provided, an input value is applied to contact 72′ with respect to contact 70′ such that the lower set of contacts 1 through 8 are effective to provide injection of current into the resistive medium or collector 10′. As illustrated, the lower portion of the letter "B" is traced at such time. Then, the input values at 70′ and 72′ are altered such that the upper set of emitters 1 through 8 are rendered effective. Just as current injection moves to the emitter numbered 8, the position of injection is moved upwardly as viewed in FIG. 8 and the upper portion of the letter "B" is then traced.

FIG. 9 illustrates a system wherein a plurality of character generator devices 84 through 89 have their orthogonally related output terminals connected to common buses $X_1$, $X_2$, $Y_1$ and $Y_2$. Also, these devices receive a common input emitter scanning as indicated at 92. Leads 94 through 99 are connected to respective base terminals of the devices 84 through 89 in order to select a particular device which will electrically describe a desired character at buses $X_1$, $X_2$, $Y_1$ and $Y_2$. The devices are, in the example, provided respectively with emitter configurations to describe the numerals "'1," "2," "3" and "4," the letter sequences "GO" and "OK." Lead 100 connects two additional base contacts included within devices 88 and 89 so that the letters "G" and "O" may be successively scanned, and the letters "O" and "K" may be successively scanned in the manner described in connection with the scanning of the upper and lower portions of the letter "B" in FIG. 8.

Figure 10:
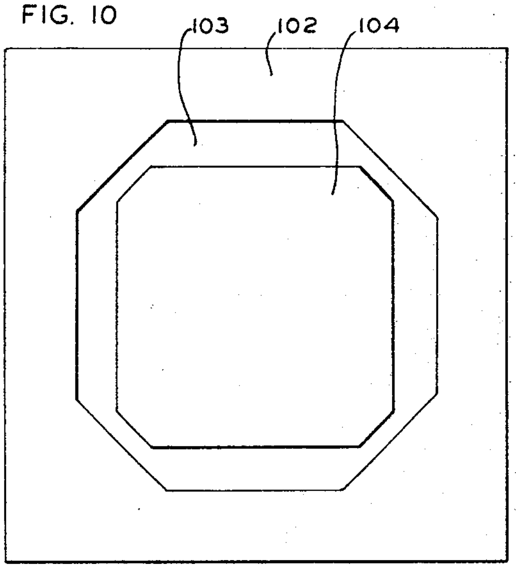
FIG. 10 is a plan view of a portion of a partially constructed semiconductor embodiment of a resistive medium employed according to the present invention.

FIGS. 10 through 14 illustrate separate portions of a semiconductor character generator device of the type hereinbefore described, or alternatively, masks employed to form such portions by conventional processes. FIG. 10 illustrates a P type isolation diffusion, surrounding an island of epitaxial N type collector material 103 which is to be the resistive medium. The collector layer of a planar NPN transistor device is resistive, its resistance for a typical process being 500 ohms per square. This can be changed by alteration of the process. FIG. 10 likewise illustrates a base diffusion 104, also P type, wherein such base diffusion does not extend down to a common substrate as does the aforementioned isolation diffusion. The masks for elements 102 and 104 are employed separately.

Figure 11:
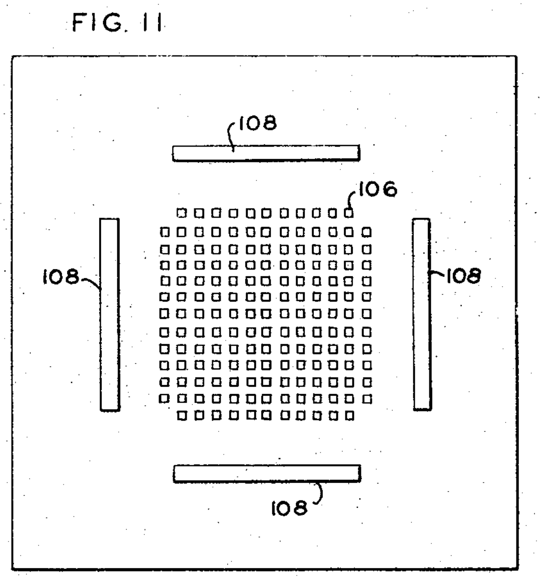
FIG. 11 is a plan view of a second portion of a partially constructed semiconductor embodiment of a resistive medium employed according to the present invention.
Figure 12:
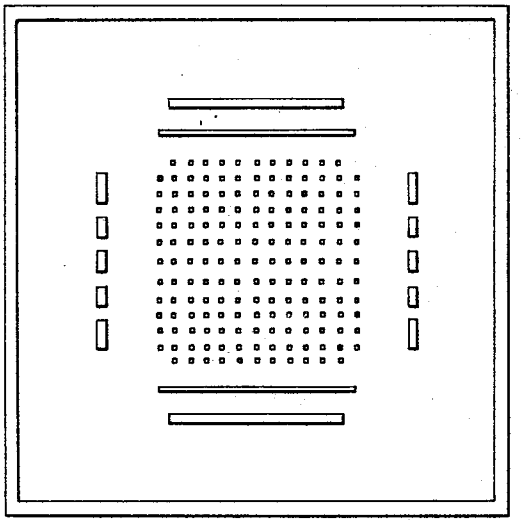
FIG. 12 is a plan view of a third portion of a partially constructed semiconductor embodiment of a resistive medium employed according to the present invention.
Figure 13:
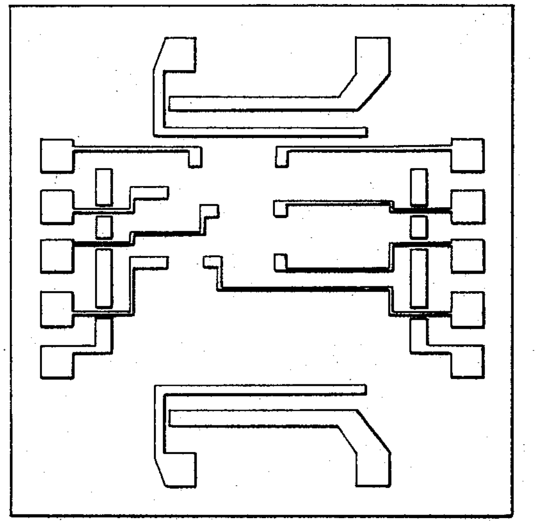
FIG. 13 is a plan view of a fourth portion of a partially constructed semiconductor embodiment of a resistive medium employed according to the present invention.
Figure 14:
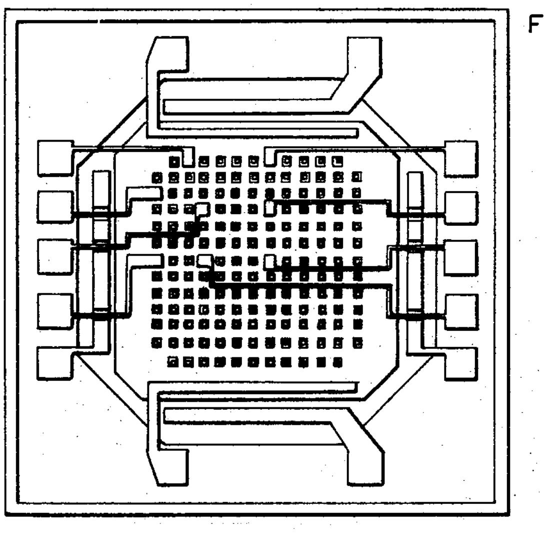
FIG. 14 is a completed semiconductor embodiment of a resistive medium according to the present invention.

FIG. 11 illustrates the emitter areas 106 and the connections or electrodes 108 for the edge of the epitaxial collector. FIG. 12 illustrates pre-ohmic connections to the emitters, base and collector, and finally, FIG. 13 illustrates aluminum connections to the various elements. In this particular example, only eight connections are made to the emitters. The array of emitters selected thereby is arbitrary, it being understood that some other array of emitters could be chosen to portray a desired character or symbol. FIG. 14 illustrates the complete device. As can be appreciated, a particular semiconductor device of this type may be employed to generate more than one character if so desired.

Figure 5:
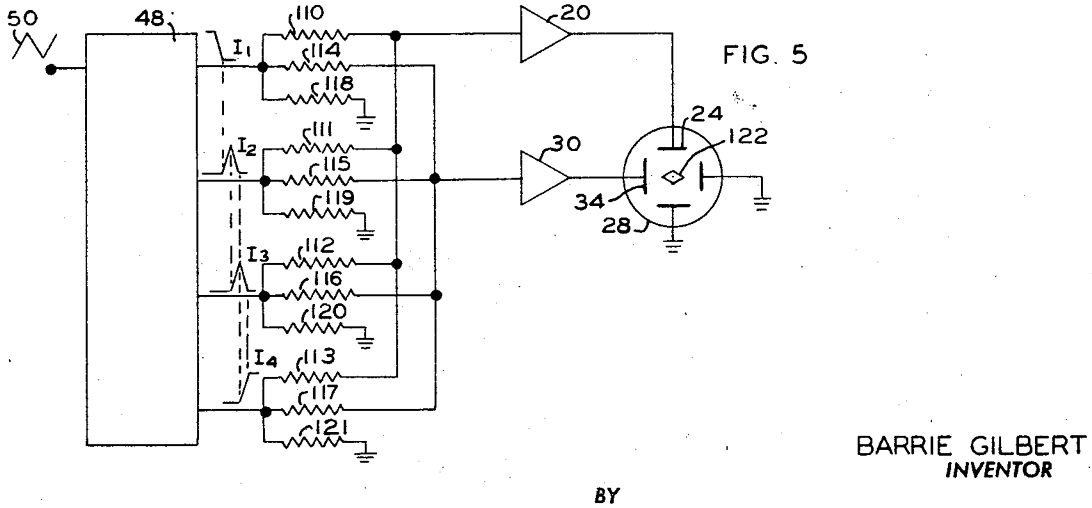
FIG. 5 is a schematic diagram of another embodiment of a character generator according to the present invention.

FIG. 5 is a schematic diagram of a resistive analog of a character generator according to the present invention. In this figure, a switching circuit 48 is agan provided with a triangular input waveform 50 for scanning the switching device by means of successive triangular waveforms $I_1$, $I_2$, $I_3$ and $I_4$. The waveforms are applied to successive Y resistors 110 through 113 as well as successive X resistors 114 through 117. "Dump" resistors 118 through 121 couple excess current to ground. The Y resistors are joined and provide an input for operational amplifier 20 coupled to Y deflection plate 24 of cathode ray tube 28. Similarly, the X resistors are coupled to X deflection plate 34 by means of operational amplifier 30. The remaining deflection plates are grounded. As in the previous embodiment, current scans the various resistive means to provide scanning of a character, i.e., to provide a portrayal 122. Continuous segments are scanned, rather than merely the end points of such segments. While the device of FIG. 5 is suitable for many applications, it has the disadvantage of the space consumption normally required by a large plurality of resistors, i.e., when a character is to be portrayed with some precision. Also the resistive networks suffer from lack of reproducibility from one such circuit to the next. Thus, the resistors must ordinarily be selected with considerable care within narrow tolerances to achieve the desired fidelity in character portrayal. A continuous resistive medium is thus preferred since it is eminently reproducible and even errors tend to ratio out in the construction of such a device. Moreover, a continuous resistive medium can be greatly miniaturized by integrated circuit techniques such as hereinbefore described.

Current steering device

Figure 15:
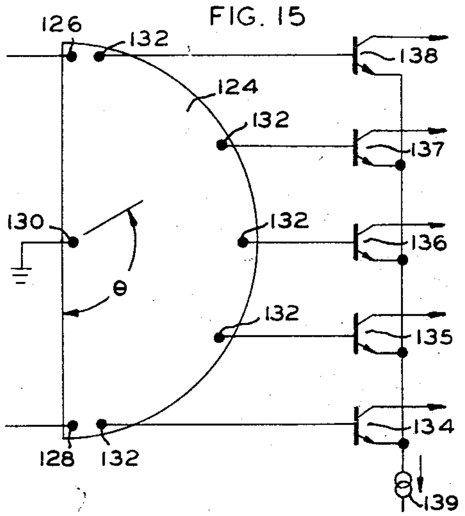
FIG. 15 is a diagram of a current steering device according to the present invention.

A current steering device according to the present invention comprises a resistive medium wherein input values are determinative of the spatial or physical location of a given output value. FIG. 15 illustrates such a device.

Referring to FIG. 15, a resistive medium 124 is provided with a first pair of input terminals or connection means 126 and 128 connected thereto, and a third connection means 130 positioned therebetween. A plurality of output connections means 132 are positioned along said resistive medium and are here proximate one edge thereof. The resistive medium 124 extends in at least two dimensions and, of course, also has some finite thickness. It preferably has a constant resistance per square unit area. The resistive medium can, for example, be planar, and can be formed of any resistive substance, such as paper provided with a resistive coating. However, a semiconductor layer is preferred inasmuch as a device may be miniaturized and may form part of a semiconductor integrated circuit or the like.

In the embodiment of FIG. 15 the resistive medium 124 advantageously has the configuration of a planar semicircle with input terminals 126 and 128 positioned at either end of the diameter thereof. Input terminal 130 is suitably located proximate the center of the device and is returned to a point of common reference potential or ground. Output terminals 132 are suitably disposed along the curved portion of the semicircle.

Each of the output terminals 132 connects to the control terminal of an amplifying device or control device such as a transistor. In the case of the present embodiment, terminals 132 connect to the respective base electrodes of transistors 134 through 138, the emitter electrodes of which are connected together and supplied a current from source 139.

Figure 40:
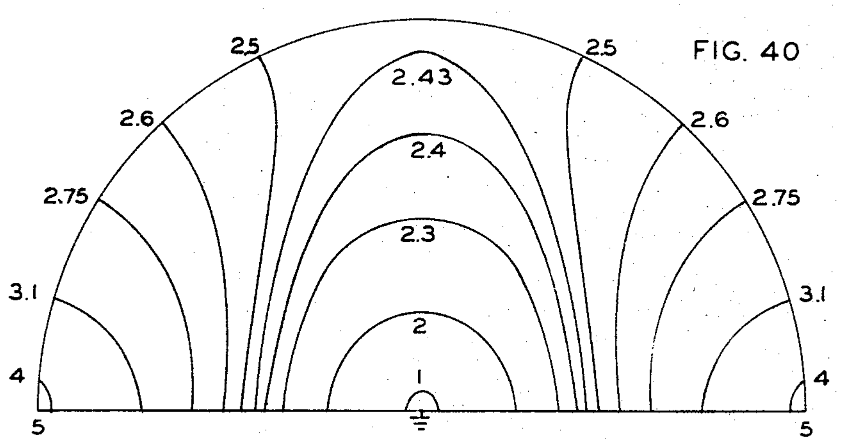
FIG. 40 is a first potential plot of a voltage distribution provided on a semi-circular current steering resistive medium according to the present invention.
Figure 41:
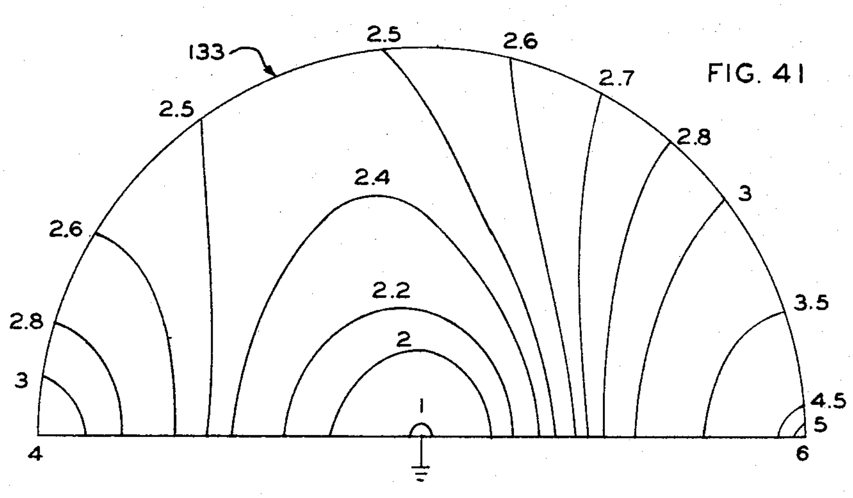
FIG. 41 is a second such plot.

The input terminals or connection means 126 and 128 are provided with complementary voltage or current inputs, for example of the form $xV$ and $(1-x)V$ or $xI$ and $(1-x)I$ wherein the factor $x$ will be considered as an input to the device. If both of the inputs supplied the terminals 126 and 128 are, for example, positive, then input terminal 130 is arranged to reside at a level which is relatively negative with respect to both terminals 126 and 128. The situation can be reversed if so desired, so that both terminals 126 and 128 are relatively negative with respect to terminal 130. As the factor $x$ is changed, that is, as the portion of input voltage or current supplied terminals 126 and 128 is changed, a differing voltage distribution is set up across resistive medium 124. Such voltage distributions in two typical cases are illustrated in FIGS. 40 and 41. A negative 5 volts is applied, for example, at diametrically opposite ends of the semicircular resistive medium illustrated in FIG. 40. Equipotential lines are drawn upon the medium with voltages indicated thereon, and it is seen that a most positive point occurs in the voltage distribution directly opposite the grounded input connection. Returning to FIG. 15, it will be seen that the output connection 132 directly opposite input connection 130 will receive the highest voltage and will cause conduction in the corresponding transistor 136. The transistors and the voltage levels are selected such that the other transistors are nonconductive at this time. Moving to FIG. 41, the input voltage applied at the diametrically opposite input connections are now −4 volts and −6 volts respectively. With this input applied, the most positive point in the voltage distribution has moved to location 133 whereby transistor 137 just above the center transistor in FIG. 15 is now caused to conduct. By changing the value of $x$, which determines the complementary input values, the current from current source 139 is readily "steered" between the collector output terminals of transistors 134 through 138. The circular geometry for the resistive medium is of advantage in that it tends to provide a nearly constant separation in selected output locations for changes in the value of $x$.

Figure 17:
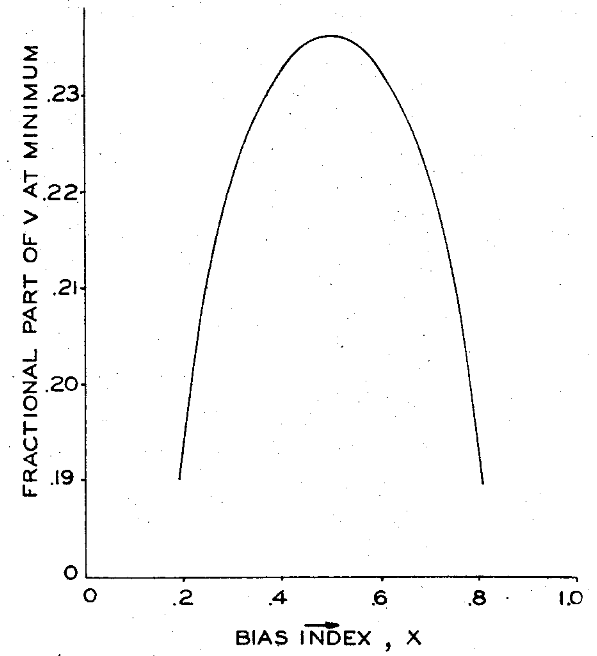
FIG. 17 is a graph plotting another characteristic curve for the FIG. 15 device.
Figure 16:
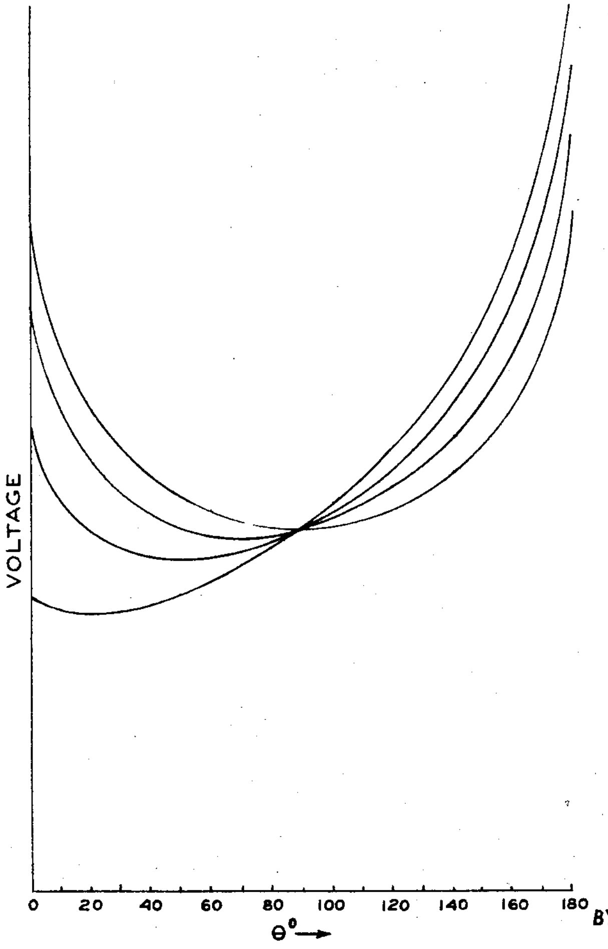
FIG. 16 is a graph including a plurality of curves characteristic of operation of the FIG. 15 device.

FIG. 16 plots the logarithm of voltage along the circular edge of the resistive medium 124 for various combinations of positive complementary voltages applied at terminals 126 and 128. In this instance, it is observed that a most negative point occurs at a position along the circular edge of the resistive medium 124, measured by the angle $\theta$. FIG. 17 illustrates the variation of the FIG. 16 minimum voltage with variation of the index $x$. It is seen that the minimum is less in voltage value for relatively large or small values of the index $x$. However, the transistors nevertheless may be adequately switched, and a current advantageously "steered" by the change in bias index $x$, whereby current from source 139 may substantially entirely pass through a selected transistor. As the index $x$, is gradually changed, the current output may be gradually transferred from one transistor collector to the next.

Figure 18:
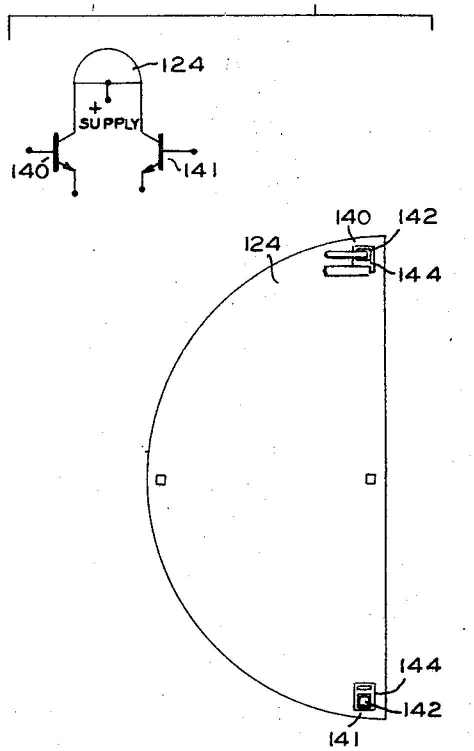
FIG. 18 is a diagram of another embodiment of a current steering device according to the present invention.

FIG. 18 illustrates a current steering device wherein transistor means 140 and 141 are integrally provided at the positions of input terminals. These transistor devices are also illustrated schematically in their connection to the resistive medium 124. Each of the transistor devices comprises an emitter 142 and a base 144 interposed between resistive medium 124 and the emitter. For example, the resistive medium 124 may comprise N type semiconductor material with the base 144 and emitter 142 respectively comprising P and N type semiconductor material. The resistive medium of FIG. 18 is thus current-driven by means of transistor devices 140 and 141.

Figure 19:
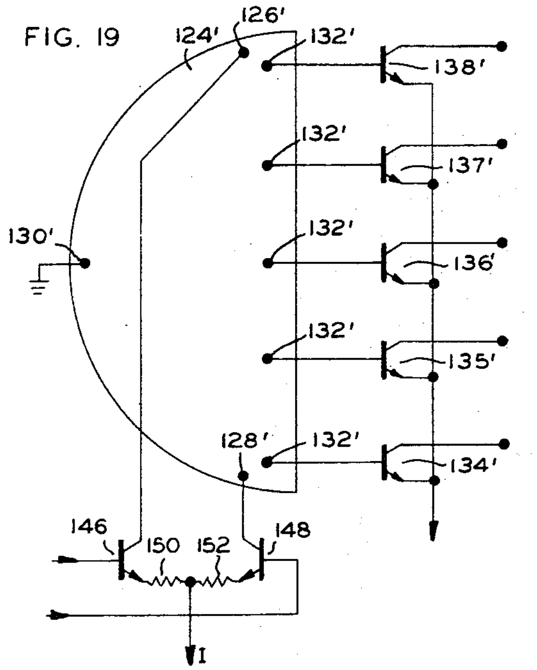
FIG. 19 is a diagram of yet another embodiment of a current steering device according to the present invention.

FIG. 19 similarly illustrates a semiconductive resistive medium 124' current-driven at input connections 126' and 128' by means of transistors 146 and 148. Complementary input voltages are applied to the base electrodes of transistors 146 and 148 and the emitter electrodes of these transistors are returned to a current source through resistors 150 and 152. Resistive medium 124' is desirably semicircular in shape as in the previous embodiments, but in this instance, a third input terminal 130' is provided proximate the center of the round periphery while output connections 132' are disposed along the straight diameter of the medium. These output connections are coupled to the base electrodes of transistors 134' through 138', and a common source of current is connected to the emitter electrodes of these transistors.

Figure 42:
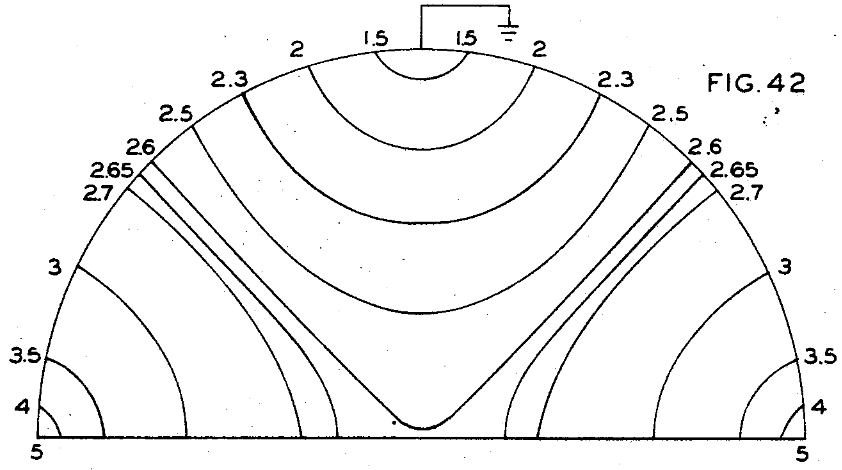
FIG. 42 is a third such plot.
Figure 43:
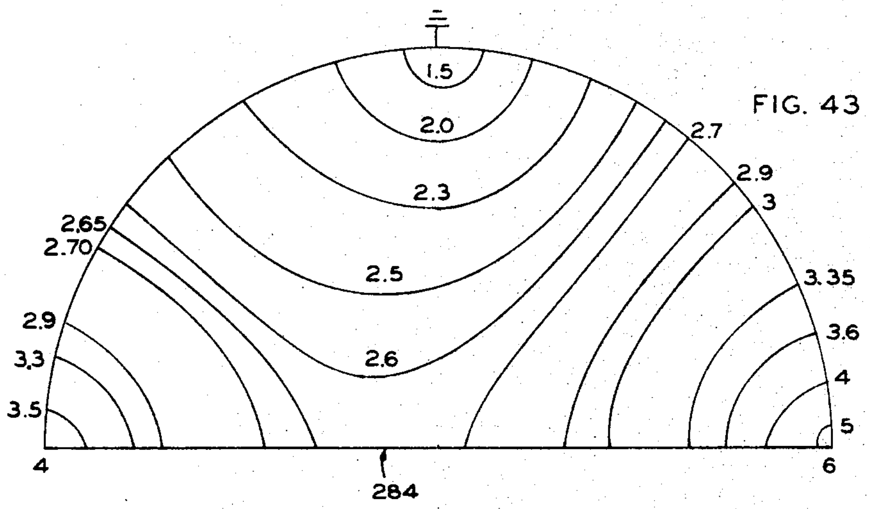
FIG. 43 is a fourth such plot.

FIG. 42 illustrates voltage distribution for a device such as illustrated in FIG. 19 when the input values applied to diametrically opposite locations on the resistive medium are equal. FIG. 43, on the other hand, illustrates an instance where the input voltages are unbalanced, and a unique voltage at location 284 is provided.

The FIG. 19 device may be utilized in a manner similar to the device shown in FIG. 15. For example, it may comprise an analog to one-out-of-five switch wherein current supplied the common emitter electrodes of the aforementioned transistors is selectively delivered to one of the collector electrodes. Another important use for the device of the general type shown in FIGS. 15 and 19 is that of an input switching means for a character generator as hereinafter more fully described.

Figure 44:
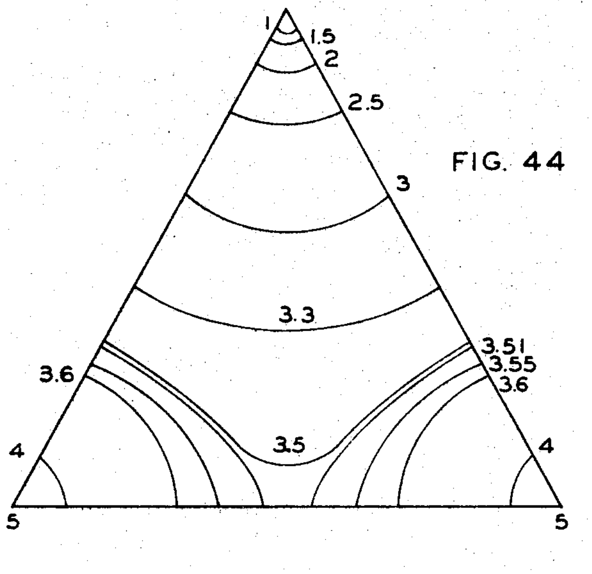
FIG. 44 is a potential plot for a triangular current steering resistive medium according to the present invention.
Figure 45:
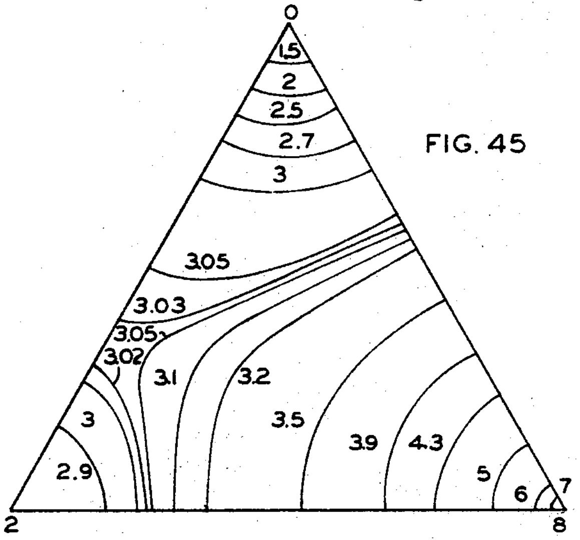
FIG. 45 is second potential plot for a triangular current steering resistive medium according to the present invention.

A resistive medium may, of course, take other shapes than semicircular, although semicircular configuration has been found to be of considerable practical advantage. FIGS. 44 and 45 illustrate voltage distributions for indicated applied voltages on triangular resistive media.

Figure 20:
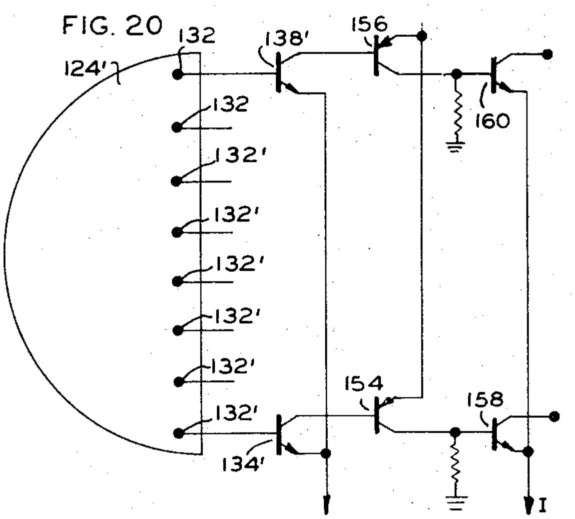
FIG. 20 is a diagram of a further current steering device according to the present invention having wave-shaping transistor means coupled to receive outputs thereof.

As will be appreciated by those skilled in the art, the voltage distributions provided on the resistive media 124 and 124', for example, are such that the output terminals 132 and 132' must not be too closely spaced, or the selective conduction of one transistor with respect to its neighboring transistor is rendered difficult. Therefore, it is desirable to add further stages of wave-shaping such as illustrated in FIG. 20. Transistors 134' and 138' correspond to the similarly numbered NPN transistors of FIG. 19. These transistors may be provided in the same integrated circuit as resistive medium 124' as hereinafter more fully described. The collector terminals of transistors 134' and 138' are connected in driving relation to base electrodes of PNP transistors 154 and 156, in turn driving NPN transistors 158 and 160. Transistors 158 and 160 are provided with a common emitter current. It is understood that similar cascaded connections may be extended from other output terminals 132' of resistive medium 124', with the last transistor of each cascaded circuit having its emitter connected to the same current source. In an integrated circuit embodiment, transistors 154 and 156 may comprise lateral PNP transistors. With the additional gain, easier selection of voltage levels leading to easier selection of particular output transistors is possible, and therefore an increased number of output terminals 132' for the resistive medium may be included. Also, this circuit permits the output transistors to be at a different D.C. level than the first rank of NPN transistors.

Figure 21:
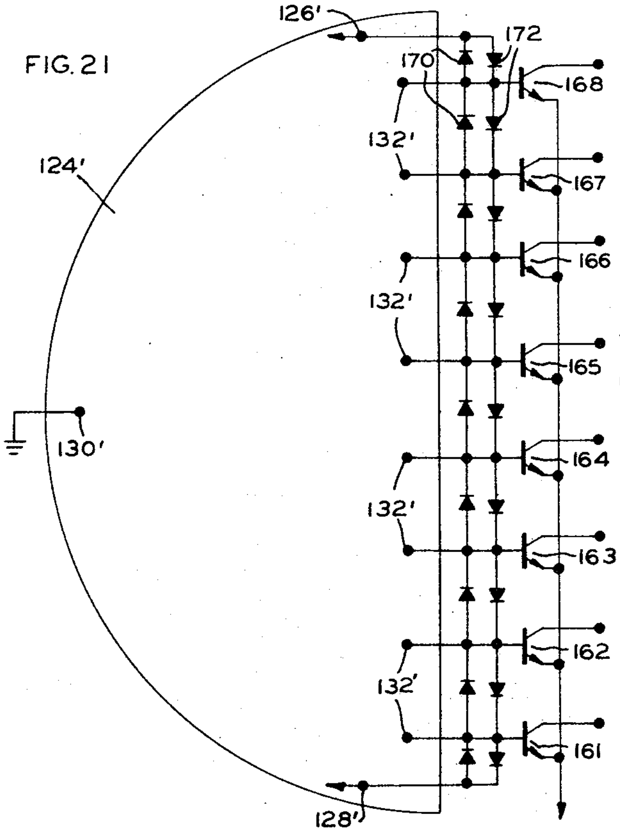
FIG. 21 is a schematic diagram of another current steering device according to the present invention including means to provide additional output levels.

FIG. 21 illustrates another means for increasing the number of output terminals 132' as may be applied to resistive medium 124' This device employs increased drive current for greater and uniform voltage separation between output terminals. The output terminals 132' are connected respectively to the base electrodes of transistors 161 through 168, the latter having their emitter electrodes connected to a common current source. Between each pair of output terminals 132' and between the end output terminals and the input terminals 126' and 128', respectively, are interposed reverse-connected diodes 170 and 172. Thus the voltages between each pair of output terminals are constrained to one diode-drop and consequently the total swing across the drive points is also reduced, or a higher drive current may be used without running into the danger of emitter breakdown at one or more of the transistors. It is therefore found that with this circuit enhanced selection of a greater number of output control devices is possible. Again, the selected transistor couples the common emitter input current at its collector electrode.

Figure 22:
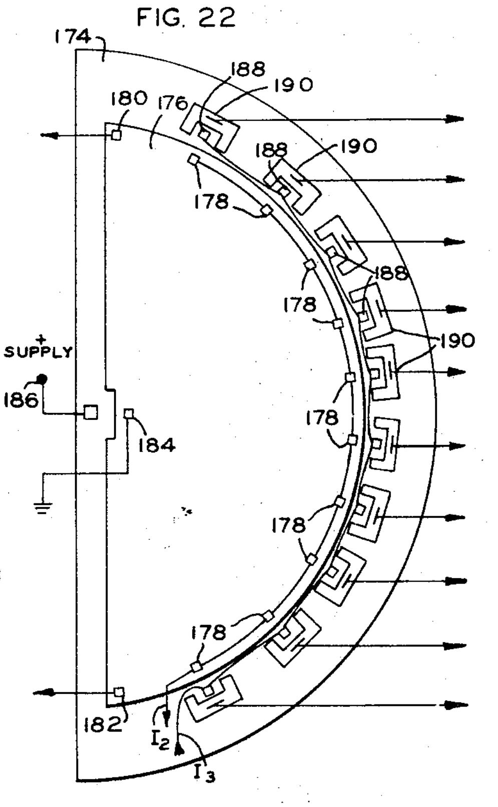
FIG. 22 is a diagram of another current steering device according to the present invention including integral transistor means.

FIG. 22 illustrates a more complex device comprising a first semicircular N type semiconductor layer 174 overlaid by a P type semicircular semiconductor layer 176. In this device, layer 176 forms the resistive medium but comprises a base electrode of a transistor configuration. It is also constructed to have substantially uniform resistivity. Around the semicircular edge of layer 176 are disposed a plurality of N type emitters 178 overlaying layer 176. These emitters are connected together and provided with a current $I_2$. Also, layer 176 is supplied complementary drive inputs by way of contacts 180 and 182, respectively, while center contact 184 is grounded. Both contacts 180 and 182 are positive with respect to ground. Contact 186 connects N type layer 174 to a positive supply voltage. It is seen that the output transistors for this device are in effect built into the same structure as the resistive medium, with each such transistor employing an emitter 178 connected to a common current source, and wherein an area of layer 176 forms the transistor base electrode, with a corresponding portion of layer 174 providing a collector electrode.

In addition, a next stage of amplification is provided in the construction of the FIG. 22 device. Around the circular edge layer 176 and spaced from the edge thereof proximate emitters 178 are P type elements 188 connected to a common source of current. Surrounding the elements 188 are C-shaped P type diffusions 190 connected to respective output terminals. The additional elements 188 and 190 form additional PNP transistor means with layer 174 similar in effect to transistors 154 and 156 of FIG. 20.

Operation of the transistor portion of the FIG. 22 device is as follows: First, ignoring the PNP regions formed by elements 188, 174, and 190, consider the layer 176 as driven from complementary current sources via contacts 180 and 182. Contacts 180 and 182 are negative with respect to contact 186. As a result, a voltage distribution will be set up on layer 176 such that one of the emitters 178 will conduct more of the current $I_2$ than the rest. This current flows into layer 174 and via the resistance thereof to contact 186. In so doing, it sets up voltage drop such as to cause the portion of layer 174 under the more heavily conducting emitter to be more negative than elsewhere. Suppose that one emitter 178 is 10 millivolts more positive than its neighbors and that all the other emitters are completely turned off. It is found that the current in the selected emitter will carry approximately 1.5 times as much current as its neighbors at 25° C. This is sufficient to set up a voltage differential of well over 100 millivolts between adjacent regions in layer 174. Now, the more negative region of layer 174 causes conduction of current $I_3$ through a PNP transistor formed by elements 188 and 190 as well as such region. The PNP transistor formed supplies virtually all current $I_3$ at one of the output terminals connected to one of the elements 190.

The device of FIG. 22 is also constructed to form another lateral PNP transistor feeding current back to layer 176, and hence enhancing the voltage differential produced in a selected region of layer 174. Diffusions 190 are proximate layer 176, and a certain amount of current is fed back to layer 176 at the chosen output region. As a result, quite shallow voltage profiles around layer 176 are sufficient to cause complete and rapid switching of an output.

Figure 23:
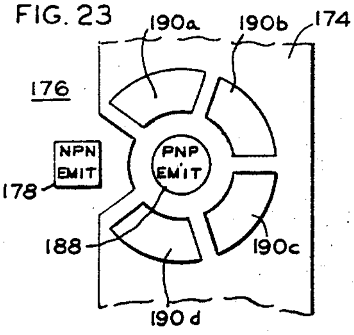
FIG. 23 is a schematic diagram illustrating a variation of part of the FIG. 22 device.
Figure 24:
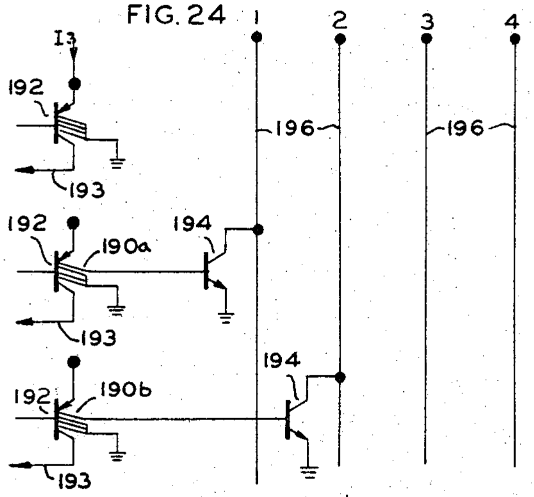
FIG. 24 is a schematic diagram illustrating connection of FIG. 23 type device in a decoding matrix.

FIG. 23 illustrates an alternative version of the FIG. 22 device wherein collector diffusion 190 of a PNP transistor configuration is broken up into a plurality of separate elements 190*a* through 190*d*. This construction is then useful in the circuit of FIG. 24 wherein successive of such PNP devices are here indicated by reference numerals 192. The PNP devices are connected to separate NPN transistors 194 in a specified pattern. Collectors of transistors 194 are connected to various collector lines 196 to produce selected outputs on these lines. For example, the lines 196 may be thus energized in accordance with a binary code designating in binary fashion the physical location selected by a resistive medium as formed by layer 176 in FIG. 22. Unused collector elements of a given transistor 192 are grounded. Connections 193 indicate feedback paths to layer 176.

MULTIPLIER DEVICE

Figure 25:
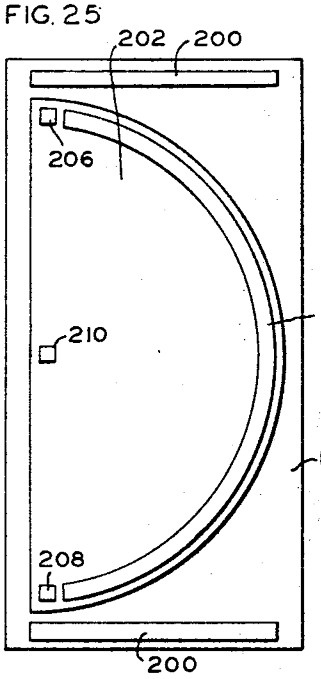
FIG. 25 is a plan view of a still further embodiment of a current steering device according to the present invention, which may be employed as an analog multiplier.

Referring to FIG. 25, a device is illustrated which is useful for multiplying and for similar purposes. The device may also be considered as an electrical analog of a mechanical potentiometer. Referring to FIG. 25, the device includes a planar epitaxial N type collector 198 which is uniformly resistive and which is provided with elongated end contacts 200. Intermediate the end contacts, a P type base layer 202 is superposed with respect to collector 198 to provide a resistive medium. The base layer has uniform resistivity and suitably takes a semicircular form with the diameter extending along one side of collector 198 between contacts 200. Along and over the curved side of base layer 202, a continuous emitter 204 is provided, while at the ends and center of the base layer, contacts 206, 208, and 210 are respectively located. A complementary input, i.e. of the form $xI$ and $(1-x)I$, is provided contacts 206 and 208 while continuous emitter 204 is suitably coupled to a source of current. Contact 210 is grounded. A voltage distribution is set up on base layer 202 so as to render the voltage uniquely variable along and under emitter 204. For example, according to the present device, complementary voltages at contacts 206 and 208 may be negative with respect to contact 210, and a relatively positive maximum is established thereby underneath a selected portion of emitter 204. A current supplied to emitter 204 will enter collector 198 principally at the location of such maximum, and will then divide between contacts 200 according to the relative distances between the maximum point and such contacts. In this manner, an electrical potentiometer is provided with the effective connection between emitter 204 and collector 198 being movable along emitter 204 in accordance with the complementary inputs provided at contacts 206 and 208.

Figure 26:
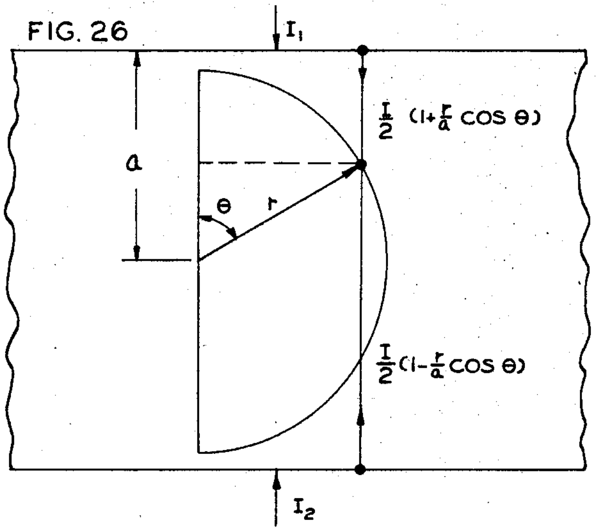
FIG. 26 is a diagram illustrating operation of the FIG. 25 device.

The device according to FIG. 25 is useful as a multiplier wherein one of the variable terms to be multiplied is a current provided emitter 204 and the other term to be multiplied is a factor $x$ controlling the complementary currents provided at contacts 206 and 208, such currents having the form $xI$ and $(1-x)I$. The output differentially provided between contacts 200 is found to be linearly proportional to the product of the input terms. Consider FIG. 26, illustrating the operation of the FIG. 25 device. Current $I_1$ at one of the contacts 200 equals $$\frac{I}{2}\left(1+\frac{r}{a}\cos\theta\right)$$

and $I_2$ at the other contact 200 equals $$\frac{I}{2}\left(1-\frac{r}{a}\cos\theta\right)$$

In these expressions, $a$ is the distance from the center of the device to a contact 200, $r$ is the radius from the center of the device to the emitter, I is the injected current from the emitter, and $\theta$ is the angle of a selected region of the device where the emitter conducts to collector 198. Thus, the output currents vary with the cosine of the angle $\theta$. However, the angle $\theta$, at which conduction from the emitter to the collector takes place, varies with the aforementioned index $x$ in accordance with an inverse cosine relationship. As a result, the device is found to provide substantially linear multiplication of the aforementioned input values. The multiplier is characterized by fast rise times, having extremely low distortion and wide dynamic range. It also, of course, may be very compact being adaptable to semiconductor integrated circuit construction.

Figure 27:
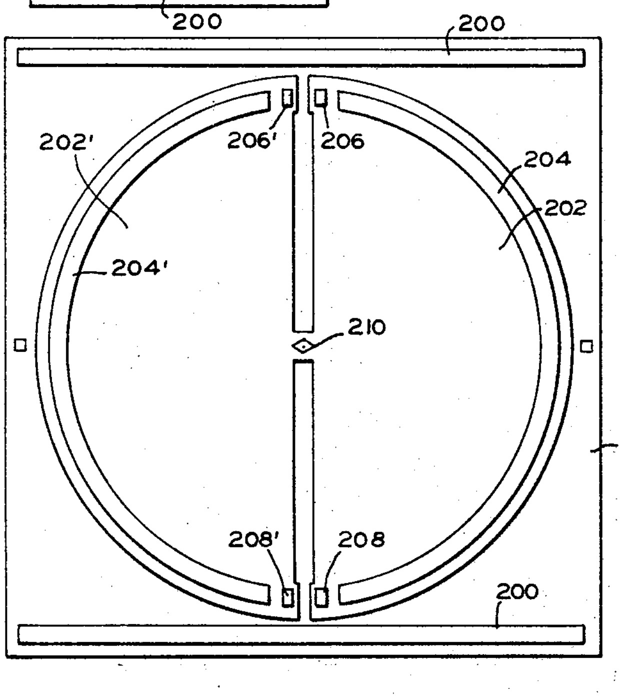
FIG. 27 is a plan view of a pair of current steering devices such as illustrated in FIG. 25 constructed to provide four-quadrant multiplier operation.

FIG. 27 illustrates a double multiplier device of the type illustrated in FIG. 25. It includes in addition to the previously described elements, a further base layer 202' having its straight diameter juxtaposed the adjacent straight diameter of base layer 202 and disposed upon the same collector 198. Contact 206' of base layer 202' is connected to contact 208, and contact 208' of base layer 202' is connected to contact 206. This configuration provides a four-quadrant multiplier as more fully illustrated in FIG. 28 wherein similar reference numerals denote similar elements.

Figures 28, 32:
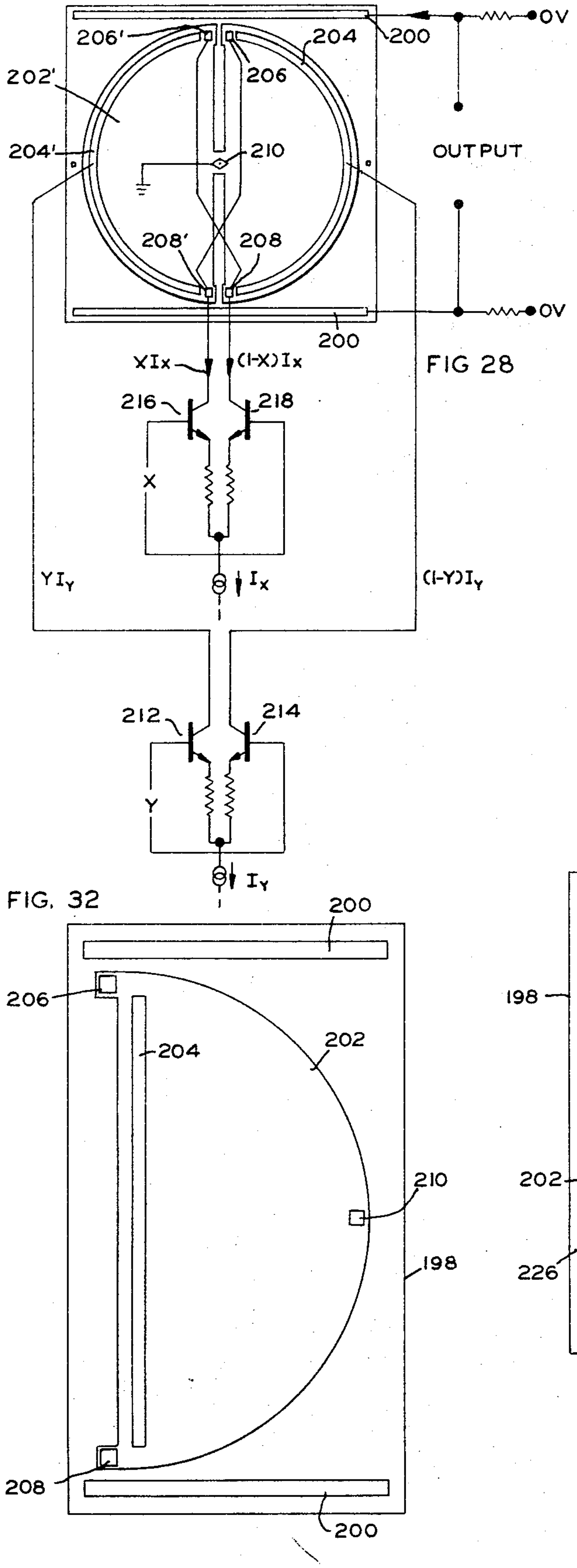
FIG. 28 is a schematic diagram of a full four-quadrant multiplier according to the present invention.
FIG. 32 is a plan view of yet another steering device according to the present invention.

Referring to FIG. 28, emitters 204' and 204 are driven by a pair of differentially connected transistors 212 and 214 having a Y input applied to the bases thereof and receiving a common emitter current $I_y$. The emitter current provided for emitter 204' equals $YI_y$, and the current provided emitter 204 equals $(1-Y)I_y$. Similarly, the cross connected contacts 206', 208 are driven by a differential pair of transistors 216 and 218 which receive an input X at the bases thereof. Contact 210 is grounded. The first set of cross-connected contacts receives a current $XI_x$, and the other set of cross-connected contacts receives current $(1-X)I_x$, where $I_x$ is the current provided the emitters of transistors 216 and 218. A differential output is secured between contacts 200 forming the product of X and Y in four-quadrants, that is, taking the sign of the input factors into account.

Figures 29, 30, 31:
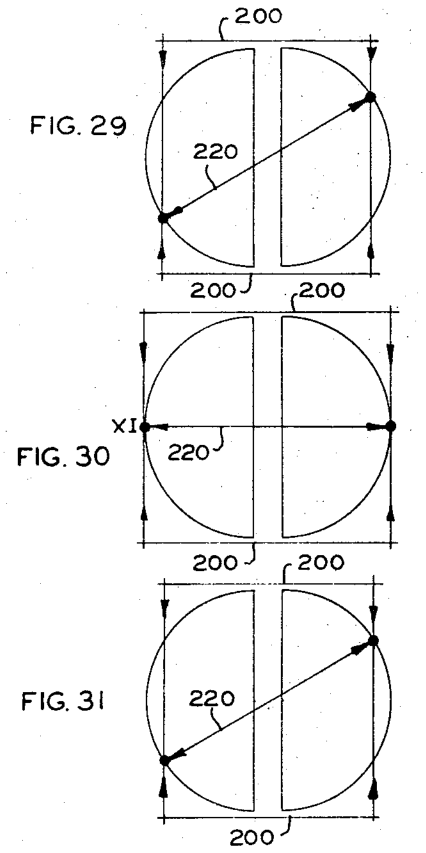
FIG. 29 is a diagram illustrating operation of the FIG. 28 multiplier with a first set of input values applied thereto.
FIG. 30 is a diagram illustrating operation of the FIG. 28 multiplier with a second pair of input values applied thereto.
FIG. 31 is a digram illustrating operation of the FIG. 28 multiplier with a third pair of input values applied thereto.

FIGS. 29, 30, and 31 are illustrative of the function of the FIG. 28 multiplier. Each of these figures represents the configuration of double resistive base regions of the FIG. 28 multiplier. During operation of the FIG. 28 device, two injection zones are generated at the two emitters at angles 180° apart as indicated by the double-headed arrows 220 in FIGS. 29, 30, and 31. When the emitter currents are equal, it makes no difference what the injection zone angles are, because the same fraction of the total current, one-half, always reaches the collector contacts indicated at 200. FIG. 29 illustrates this condition. On the other hand, if the injection zone angles are 90° from the collector contacts, it again does not matter what the two emitter currents are because one-half still reaches each collector contact. This situation is illustrated in FIG. 30. Only when there is a difference in the two emitter currents and in the angles does a differential output appear, and it will be seen that the output produced will be the product of the inputs. The last situation is illustrated in FIG. 31. The multiplier according to the present invention is typically useful as a modulator, frequency doubler, waveform squarer, or as a wideband gain control.

Function generator

FIG. 32 illustrates the same type of device as illustrated in FIG. 25 and wherein similar elements are referred to by like reference numerals. The FIG. 32 device differs in that the emitter 204 extends along the straight diameter of collector 198 while input contact 210 is positioned centrally of the curved periphery thereof. The device otherwise operates in a substantially similar manner, and may be considered to be an electrically operated potentiometer. This device is also useful for producing an inverse cosine function between contacts 200, for a linearly changing input provided by the input contacts 206 and 208. This type of device therefore suitably comprises a function generator.

Figure 33:
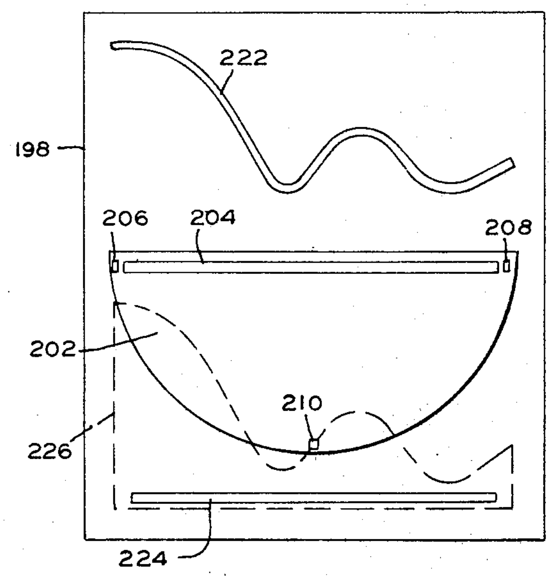
FIG. 33 is a plan view of a function generator according to the present invention.

Another function generator is illustrated in the composite view in FIG. 33. The FIG. 32 device again includes a collector layer 198 here extended and provided with a shaped collector contact 222 opposite the straight side of base layer 202. As changing complementary inputs are provided at contacts 206 and 208 for shifting the injection of current along emitter 204, the distance to collector contact 222 changes, and therefore the output procured from contact 222 changes in accordance with the shape of contact 222. An alternative means for providing an arbitrary function employs a straight collector contact 224 and a shaped semiconductor buried layer 226 which similarly affects the resistance between contact 224 and the location of emitter 204. The buried layer has almost zero resistance compared with the collector, so the effect thereof is to place the collector contact closer or farther from the emitter. Nearly any function can be generated by changing the shape or effective shape of the collector contact or contacts.

Figure 34:
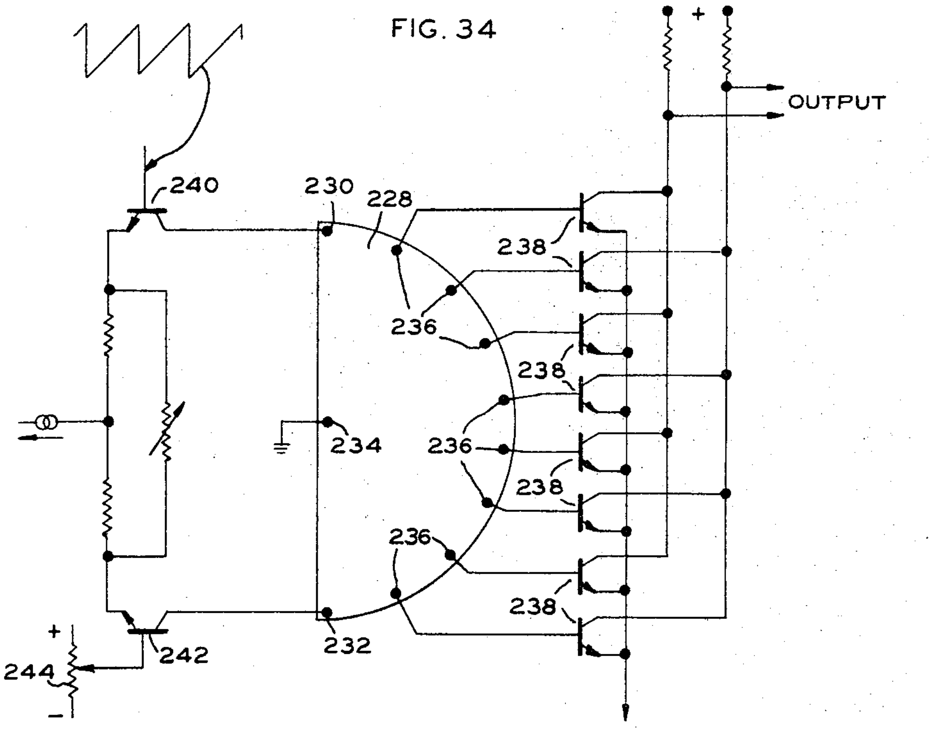
FIG. 34 is a schematic diagram of another function generator according to the present invention.

FIG. 34 illustrates another type of function generator for generating a sine wave. Here, the resistive medium 228 is provided with diametrically opposite contacts 230 and 232 and a center contact 234. A plurality of output connection means 236 are located along the curved edge of the resistive medium and each of these output connection means drives a transistor 238. The emitters of all transistors 238 are connected to a common current source. An output is differentially supplied between collectors of alternate transistors which are connected together. Contacts 230 and 232 are driven by differentially connected input transistors 240 and 242 having a common source of emitter current. A sawtooth wave is applied to the base of transistor 240, while the base of transistor 242 is connected to a phase-angle adjusting potentiometer 244. The current provided the emitters of transistors 240 and 242 is low enough to insure only partial switching of output transistors 238 as the sawtooth input wave is applied between the input terminals. The output generated comprises a sine wave and the phase thereof may be adjusted through ±90° or more by means of potentiometer 244.

As will be appreciated, the character generator devices as hereinbefore described may also be considered function generators. Many other function generator devices employing a resistive medium according to the present invention are possible.

Memory device

Figure 35:
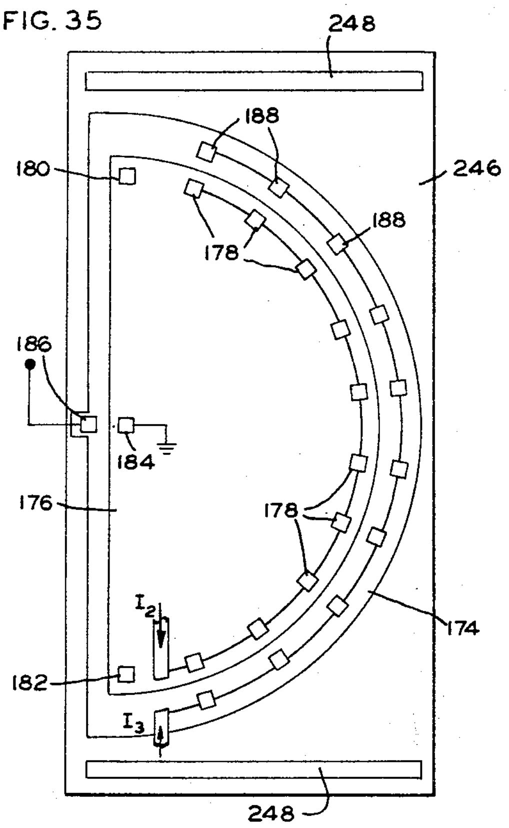
FIG. 35 is a plan view of a current steering device according to the present invention which may be used as a memory device.
Figure 36:
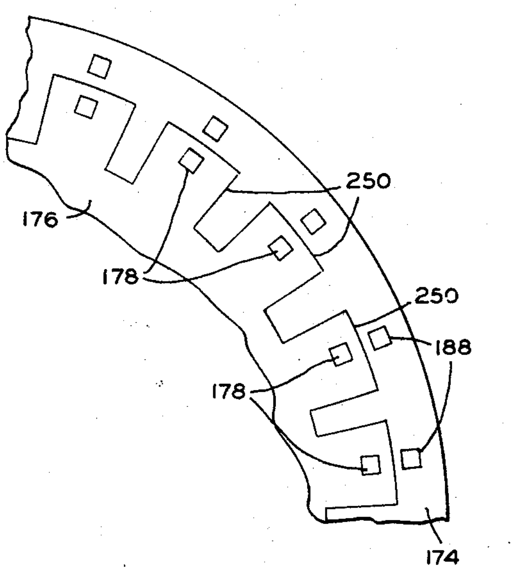
FIG. 36 illustrates a variation of the device of FIG. 35.

The device of FIG. 35 is useful for memory purposes and is similar to the device of FIG. 22, with like elements being referred to by like reference numerals. Here, N type layer 174 is disposed on a P type substrate 246 forming PNP transistor devices with emitters 188 and layer 174. P type substrate 246 is provided with elongated end contacts 248. When the current delivered to any emitter 188 by operation of the device is small, there is negligible positive feedback to layer 176. However, as a suitable analog complementary input is applied between terminals 180 and 182 as hereinbefore described, one of the emitters 188 is driven to a voltage appropriate for causing injection of current into layer 174. If it is desired to hold or store such input, the PNP emitter current to emitters 188 is raised to the regeneration level causing feedback, hereinbefore discussed in connection with FIG. 22, to be intensified. Feedback takes place in the FIG. 35 device via layers 174 and 176. Now the input is no longer able to control the output selected and the selected emitter 188 continues to inject current even though the input to 180 and 182 is removed. Alternatively, the input can continue to "swing" through a scanning waveform or the like and the previously selected emitter will continue to inject current, the only proviso being that the voltage change caused by the input excursion is less than the voltage generated by the feedback current as it flows in the resistance of layer 176. The latter condition may be more easily met by placing the NPN emitters 178 on peninsulas 250 as illustrated in FIG. 36 leading to a "cogwheel" type of appearance. In the FIG. 36 configuration, the resistance of region 176 has thus been deliberately raised so that less PNP collector current is needed to insure latching of the device. The output from the device may be determined differentially, e.g. in analog fashion, between contacts 248, or positionally from the PNP device which is conducting.

Character generator operated by a current steering device

The character generator devices hereinbefore described are suitably operated by current steering devices as also hereinbefore described, and both may be suitably accommodated in an integrally related semiconductor structure. A schematic diagram of a circuit of this type is illustrated in FIG. 37 wherein a first resistive semiconductor medium 252 comprising a semiconductor collector is provided with Y edge connections 254 and 256 and orthogonally related X edge connections 258 and 260. These edge connections are suitably coupled to an X–Y display means such as an oscilloscope or the like. At various selected points upon medium 252 are disposed base regions 262 supporting emitters 264. The emitters 264 are connected together and brought out to a selection terminal 266 used for selecting a particular character while the base regions are connected to output connections 268 of second semiconductive resistive medium 270. Second resistive medium 270 is provided with input connection means 272 and 274 between which a complementary input is provided of the form $x$I and $(1-x)$I. Input terminal 276 is suitably grounded. As input terminals 272 and 274 are scanned, e.g. by a triangular waveform, output connections 268 respectively provide an activating voltage to one base region 262 after another. The base region selected will permit emitter current applied at terminal 266 to reach medium 252. It is noted the combination of elements 262 and 264 with semiconductor medium 252 provide output transistors for medium 270. Resistive medium 270 is operated such that transfer of current from one region of medium 252 to the other is gradual, whereby orthogonal voltages are provided on contacts 254, 256, 258, and 260 representative of linear segments of a predetermined character or symbol generated according to the configuration of emitters 264. Substantially continuous scanning of the segments of a selected character is thereby suitably provided for portrayal on an oscilloscope or the like and to which edge connections 254, 256, 258, and 260 are coupled.

The FIG. 37 device may be employed, for example, to provide an output for scanning more than one character. However, other configurations of a resistive medium 252 are possible wherein current injection means do not necessarily correspond to the outline of the character. A device of this type is illustrated in FIG. 38 wherein like reference numerals refer to like elements. In this device, resistive medium 252 comprises a semiconductor collector region superposed by eight base regions 278 which are suitably rectangular in shape and which may be spaced in a parallel manner from one another. Each of these base regions is connected to one of the output connections 268 of resistive medium 270. Between resistive regions 278 are interspersed a plurality of collector contacts 280 here arranged in uniform rows between the base regions, these contacts being more clearly illustrated in the detailed view of FIG. 39 to which reference is now made. An emitter 282 is located upon base region 278 between an array of four such contacts. It is thus suitably located within a rectangular area defined by four collector contacts wherein one such collector contact is designated by the letter X and is connected to the other similarly indicated collector contacts, and wherein another of the four contacts in rectangular array is designated by the letter Y. Two other contacts are designated by the letter D. The Y and D contacts are similarly connected to other like designated contacts. It will be seen that emitter 282 is thereby located at a predetermined distance defining a predetermined resistance in medium 252 between itself and respective X and Y contacts.

Returning to FIG. 38, a given selected output connection 268 of second resistive medium 270 smoothly selects one of the base regions 278 after another as scanning input is applied between terminals 272 and 274. At the same time an emitter line 284 is energized corresponding to a particular character, the coordinates of which are to be generated. As each base region 278 is sequentially energized, emitters connected to lead 284 inject current into medium 252 and this current divides between X and Y terminals according to the distance of the emitter thereto as indicated in FIG. 39. Excess current will be taken up by drain terminals marked "D" which may be grounded through a resistance or the like. All X terminals and Y terminals are connected together and are suitably coupled to X and Y deflection means of an X–Y scanning device. As each successive base region is selected, the X and Y outputs provided change smoothly to electrically define segments of characters respectively represented by the positions of successive emitters 282 with respect to X and Y collector terminals. The FIG. 38 device is advantageous in that it permits a greater number of characters to be represented within a given semiconductor area, and without as many cross connection problems, and the like. The devices of both FIGS. 37 and 38 employ a minimum number of input terminals for producing deflection voltages for the scanning of a character or symbol.

There is thus provided according to the present invention a resistive conversion device for converting physical position to electrical coordinates, or to produce continuous physical scanning, or current steering. The current steering device may be described as one employing a traveling domain with the resulting action lying half way between field-effect injection and the bipolar action of conventional transistors. The resistive conversion device according to the present invention may be employed in many forms and for many uses in addition to those hereinbefore set out. It may also be used, for example, as a stepping switch or a counter or as a fast acting analog-to-digital converter.

While I have shown and described several embodiments of my invention, it will be apparent to those skilled in the art that many other changes and modifications may be made without departing from my invention in its broader aspects. I therefore intend the appended claims to cover all such changes and modifications as fall within the true spirit and scope of my invention.

I claim:

1. A device for conversion of positional information to electrical information comprising:

a resistive medium extending in two dimensions to define a resistive area, input connection means for applying electric values as inputs to said resistive medium and output connection means spaced on said resistive medium from said input connection means, said output connection means being separated from said input connection means by at least a portion of said area for receiving electrical values from said resistive medium, said output connection means comprising plural electrodes connected to said resistive medium and positioned to define a coordinate system, with said input connection means being geometrically positioned on said coordinate system defined by said output connection means, and means for shifting an input successively from each input connection means to the next input connection means in a regular order.

2. The device according to claim 1 wherein said input connection means defines an intelligence input by relative location, and wherein said means for shifting an input maintains the sum of values applied to input connection means substantially constant.

3. The device according to claim 1 wherein said input connection means define an alpha-numeric character upon said resistive medium.

4. A device for conversion between electrical and positional information comprising:

a resistive medium extending spatially in two or more dimensions to define at least a resistive area, plural spaced input connection means for applying electrical values as inputs to said resistive medium, and plural output connection means spaced on said resistive medium from said input connection means and separated therefrom by at least a portion of said area for receiving electrical values from said resistive medium, the physical location of the input connection means with respect to the resistive medium and the electrical values appearing thereat being interrelated by the geometry of the medium so that the output values may be determined by the input physical location and value, the output connection means comprising coordinately interrelated electrodes connected to said resistive medium, with said input connection means being geometrically positioned on said resistive medium according to a coordinate system defined by said output connection means, said input connection means defining an alpha-numeric character upon said resistive medium, and means for gradually shifting an input current as an electrical input value from one such input connection means to another input connection means such that the sum of the current values applied to said input connection means is substantially constant.

5. A device for conversion of electrical information to positional information comprising:

a resistive medium extending in two dimensions to define a resistive area, three input connection means for applying electrical values as inputs to said resistive medium, and output connection means spaced on said resistive medium from said input connection means, said output connection means being separated from said input connection means by at least a portion of said area for receiving electrical values from said resistive medium, two of said input connection means being diametrically opposite one another, and means for applying complementary inputs to said two input connection means to provide a voltage distribution substantially along a locus between said two input connection means, said voltage distribution being characterized by a voltage maximum or minimum, a plurality of said output connection means being spaced along said locus substantially between said two input connection means, the variation of complementary values applied to the input connection means being determinative of the position of the maximum or minimum to select said output connection means.

6. The device according to claim 5 wherein complementary inputs provided said two input connection means are of the form $xI$ and $(1-x)I$, wherein I is a given current, and $x$ is an independent variable in the range between zero and one, the third input connection means being coupled to a point of reference potential.

7. The device according to claim 5 wherein said resistive medium is substantially semicircular with said two input connection means being located at diametrically opposite positions substantially along the semicircular diameter, said output connection means being spaced proximate a side of said resistive medium substantially between said two input connection means.

8. The device according to claim 7 further including a plurality of control devices respectively receiving control inputs from said output connection means, with said control devices also receiving a common input current from a common current source.

9. The device according to claim 8 further including wave-shaping circuitry connected to the output of each such control device.

10. The device according to claim 8 wherein said control devices comprise transistors.

11. The device according to claim 10 wherein said resistive medium comprises a semiconductive layer and wherein said transistors comprise plural semiconductive means disposed proximate an edge of said resistive medium with a localized portion of said resistive medium forming a control element for each such transistor.

12. A device for conversion between electrical and positional information comprising:

a resistive medium extending in two or more dimensions to define at least a resistive area, three input connection means for applying electrical values as inputs to said resistive medium, and plural output connection means spaced on said resistive medium from said output connection means and separated therefrom by at least a portion of said area for receiving an electrical value from said resistive medium, the physical location of the connection means with respect to the resistive medium and the electrical values appearing thereat being interrelated by the geometry of the medium so that input values are employed to determine the physical location of a given output value, said three input connection means having input values applied thereto to form a voltage distribution across an area of said resistive medium characterized by voltage maximum or minimum, two of said input connection means having inputs applied thereto which are complementary of the form $xI$ and $(1-x)I$, wherein I is a given current, and $x$ is an independent variable in the range between zero and one, given complementary input values applied to the input connection means being determinative of the maximum or minimum position among the output connection means.

13. A device for conversion between electrical and positional information comprising:

a resistive medium extending spatially in two or more dimensions to define at least a resistive area, three input connection means for applying electrical values as inputs to said resistive medium and plural output connection means spaced on said resistive medium from said input connection means and separated therefrom by at least a portion of said areas for receiving an electrical value from said resistive medium, the physical location of the connection means with respect to said resistive medium and the electrical values appearing thereat being interrelated by the geometry of the medium so that the output value and physical location thereof may be determined by the input values, the input values applied to said input connection means forming a voltage distribution across an area of said resistive medium characterized by a maximum or minimum, the variation of input values applied to the input connection means being determinative of the position of the maximum or minimum among said output connection means, said resistive medium being substantially semicircular, wherein a pair of input connection means are located at diametrically opposite positions on said resistive medium, said output connection means being spaced proximate a side of said resistive medium between said pair of input connection means, a plurality of control devices respectively receiving control inputs from said output connection means, with said control devices also receiving a common input current from a common current source, and feedback means coupling each such control device to its corresponding output connection means for enhancing the output produced by such control device.

14. A device for conversion between electrical and positional information comprising:

a resistive medium extending spatially in two or more dimensions to define at least a resistive area, three input connection means for applying electrical values as inputs to said resistive medium and plural output connection means spaced on said resistive medium from said input connection means and separated therefrom by at least a portion of said areas for receiving an electrical value from said resistive medium, the physical location of the connection means with respect to said resistive medium and the electrical values appearing thereat being interrelated by the geometry of the medium so that the output value and physical location thereof may be determined by the input values, the input values applied to said input connection means forming a voltage distribution across an area of said resistive medium characterized by a maximum or minimum, the variation of input values applied to the input connection means being determinative of the position of the maximum or minimum among said output connection means, said resistive medium being substantially semicircular, wherein a pair of input connection means are located at diametrically opposite positions on said resistive medium, said output connection means being spaced proximate a side of said resistive medium between said pair of input connection means, a plurality of control devices respectively receiving control inputs from said output connection means, with said control devices also receiving a common input current from a common current source, and semiconductor diode means reverse-connected between adjacent output connection means.

15. A device for conversion between electrical and positional information comprising:

a resistive medium extending spatially in two or more dimensions to define at least a resistive area, three input connection means for applying electrical values as inputs to said resistive medium and plural output connection means spaced on said resistive medium from said input connection means and separated therefrom by at least a portion of said area for receiving an electrical value from said resistive medium, the physical location of the connection means with respect to said resistive medium and the electrical values appearing thereat being interrelated by the geometry of the medium so that the output value and physical location thereof may be determined by the input values, the input values applied to said input connection means forming a voltage distribution across an area of said resistive medium characterized by a maximum or minimum, the variation of input values applied to the input connection means being determinative of the position of the maximum or minimum among said output connection means, said resistive medium being substantially semicircular, wherein a pair of input connection means are located at diametrically opposite positions on said resistive medium, said output connection means being spaced proximate a side of said resistive medium between said pair of input connection means, a plurality of control devices respectively receiving control inputs from said output connection means, with said control devices also receiving a common input current from a common current source, said control devices comprising transistors, and second transistors forming a part of a common semiconductive integrated circuit with said device, said second transistors being cascaded with said first mentioned transistors.

16. The device according to claim 15 wherein said second transistors are disposed in coupling relation to the first mentioned transistors to provide a feedback circuit therewith.

17. The device according to claim 15 wherein each such second transistor includes plural collectors, and separate lines interconnecting selected of said plural collectors to provide a decoding matrix.

18. A semiconductor device comprising:

a first planar collector electrode, a second planar base electrode disposed thereover and provided with three input connection means, two of said input connection means being diametrically opposite one another, and means for applying complementary inputs to said two input connection means to provide a voltage distribution therebetween characterized by a voltage maximum or minimum, and an elongated emitter electrode disposed along and in superimposed relation with said base electrode and extending generally between said two input connection means, said elongated emitter electrode being provided with means for connecting said emitter electrode to a source of current therefor, said maximum or minimum being positionable along said emitter electrode in accordance with the complementary inputs provided said two input connection means.

19. A semiconductor device comprising:

a first planar collector electrode having collector contacts connected thereto, a second planar base electrode disposed over said collector electrode and provided with plural input connection means, an elongated emitter electrode disposed along and in superimposed relation with said base electrode provided with means for connecting said emitter electrode to a source of current therefor, and means for providing electrical input values to said input connection means to provide a voltage distribution across an area of said base electrode which is shiftable in accordance with said input values to position an active area along said emitter electrode, said collector electrode being resistive such that the electrical values received at said collector contacts is a measure of the active location of said emitter electrode with respect to said collector contacts.

20. The device according to claim 19 including means to provide a first electrical current value to said emitter electrode, and second complementary electrical values to said input connection means, said device forming a multiplier wherein a differential output between said collector contacts is proportional to the product of said complementary input values and said emitter current value.

21. The device according to claim 19 wherein said base electrode is substantially semicircular, said collector contacts being laterally spaced from diametrically opposite ends of said semicircular base electrode.

22. The device according to claim 21 including an additional semicircular base electrode disposed upon the same collector electrode to complete a circular configuration with the first mentioned base electrode, said base electrodes being provided with emitter electrodes disposed thereover and proximate opposite circular edges thereof, and means cross connecting input connection means of said base electrodes to provide a multiplier wherein a first input is differentially coupled to said cross connected input connection means, and wherein a further input is differentially coupled to the respective emitter electrodes, the output being provided differentially at the said collector contacts.

23. The device according to claim 18 further including shaped collector contact means for said collector electrode to provide a specified function output therefrom.

24. The device according to claim 1 wherein said resistive medium comprises a semiconductor collector, said input connection means comprising emitter terminals coupled to said collector.

25. The device according to claim 24 further including base electrodes disposed between said collector and said emitter terminals, and means for driving a base electrode to affect the disposition of currents supplied by said emitter electrodes.

26. A display system including a plurality of semiconductor resistive media each comprising a collector electrode provided with a plurality of emitter electrodes which are selectively energized to define the configuration of an alpha-numeric character, each medium having a base electrode disposed between its collector electrode and its plural emitter electrodes, each collector electrode having plural contacts for coupling to a common display device, and means for providing an electrical value to a selected base electrode in order to select the collector electrode associated therewith and therefore a configuration which its associated emitter electrodes represent.

27. The device according to claim 1 wherein said resistive medium comprises a semiconductor collector electrode, and including plural input connection means comprising plural emitter electrodes, each of said emitter electrodes having an associated base electrode disposed between an emitter electrode and the collector electrode, and means for coupling control voltages to said base electrodes.

28. The device according to claim 1 wherein said means for shifting an input comprises a second resistive medium having plural input connection means, and plural output connection means coupled to input connection means of the first mentioned resistive medium, a pair of the input connection means of the second resistive medium being provided with varying input values effective to successively select output connection means thereof, and therefore input connection means of the first mentioned resistive medium.

29. A semiconductor character generation device comprising:

a collector electrode, a plurality of base electrodes each comprising a resistive medium, and emitter electrodes superimposed with respect to the plural base electrodes, with emitter electrodes representing a particular character and being intercoupled to receive an energizing electrical value, a plurality of collector contacts interspersed between said base electrodes and connected to said collector electrode, and means coupling said collector contacts together in two groups to define a coordinate system relative to respective of said emitter electrodes, and means to selectively energize said base electrodes.

30. The device according to claim 29 wherein said means to selectively energize said base electrodes includes a further resistive medium, a plurality of output electrodes connected at spaced locations on said further resistive medium and coupled to said plurality of base electrodes, and plural input electrodes connected to said further resistive medium to provide selection of a particular output electrode and therefore of a particular base electrode.

31. Apparatus for providing output values for displaying a predetermined symbol, said apparatus comprising:

an X-Y display device, resistive means coupled to deflection means of said X-Y display device including input terminals connected to different resistive values representative of differing points on the symbol to be generated, and means for scanning such terminals to provide an input gradually changing from one terminal to the next for generating a segment through a gradual change in deflection between corresponding character points, wherein the segments as displayed have a selected angular position and length determined by the resistive values of said resistive means.

32. The apparatus according to claim 31 wherein said resistive values are provided as portions of a common resistive medium having said terminals connected thereto.

33. The apparatus according to claim 32 wherein a plurality of resistive values determine consecutive segments of a complex character, said values being consecutively scanned by gradual consecutive input transferral between resistive values.

34. Character generation means comprising:

a resistive medium extending spatially in two or more dimensions, plural input connection means for applying an electrical value to said resistive medium, means for shifting said electrical value between said input connection means, two orthogonal pairs of output connection means spaced on said resistive medium from said input connection means for receiving electrical values from said resistive medium, said orthogonal pairs of output connection means defining a coordinate system, said output connection means receiving portions of said electrical value according to the distance from said input connection means to said output connection means in said medium, and means for coupling said output connection means to deflection apparatus of said X-Y display device.

35. The device according to claim 34 wherein said resistive medium comprises a body of semiconductor material, with said input connection means being positioned thereon substantially between said output connection means to determine the proportional electrical values applied to said output connection means.

36. The device according to claim 5 wherein the third input connection means has the same relative sense with respect to values applied to both said pair of input connection means so that a voltage distribution is provided with at least one extreme value which is movable on said medium in accordance with said complementary input values.

37. The device according to claim 5 wherein said resistive medium comprises a body of semiconductor material.

38. The device according to claim 1 further including an X-Y display device and means coupling said output means to the deflection apparatus of said X-Y display device.

39. The device according to claim 1 wherein said resistive medium comprises a layer of semiconductor material.

References Cited

UNITED STATES PATENTS

| | | | |
|---|---|---|---|
| 2,586,080 | 2/1952 | Pfann | 307—299 XR |
| 2,800,617 | 7/1957 | Pankove | 307—299 XR |
| 2,851,615 | 9/1958 | Sziklai et al. | 307—299 |
| 3,025,342 | 3/1962 | Volberg | 307—299 XR |
| 3,119,028 | 1/1964 | Cook | 307—303 XR |
| 3,178,566 | 4/1965 | Harpell | 235—197 |
| 3,252,006 | 5/1966 | Post | 307—299 XR |
| 3,355,692 | 11/1967 | Poland | 235—197 XR |
| 3,423,528 | 1/1969 | Bradshaw et al. | 235—198 XR |

DONALD FORRER, Primary Examiner

J. ZAZWORSKY, Assistant Examiner

U.S. Cl. X.R.

307—303; 315—18; 338—309; 340—324; 317—235; 235—194, 198

UNITED STATES PATENT OFFICE
CERTIFICATE OF CORRECTION

Patent No. 3,524,998 Dated August 18, 1970

Inventor(s) BARRIE GILBERT

It is certified that error appears in the above-identified patent and that said Letters Patent are hereby corrected as shown below:

Column 3, line 47: "diagrm" should be --diagram--.
Column 4, line 5: After "is", insert --a--; line 27, "preferably" should be --preferable--.
Column 5, line 9: "point" should be --points--; line 24, "point" should be --points--; line 65, "emitted" should be --emitter--.
Column 6, line 31: " ""1" " should be --"1"--; line 69, "agan" should be --again--.
Column 15, line 29: "electric" should be --electrical--.
Column 20, line 63: "claim 32" should be --claim 31--.

SIGNED AND SEALED NOV 24 1970

(SEAL)
Attest:

Edward M. Fletcher, Jr.
Attesting Officer

WILLIAM E. SCHUYLER, JR.
Commissioner of Patents